United States Patent [19]
Akao et al.

[11] Patent Number: 6,069,196
[45] Date of Patent: May 30, 2000

[54] MOLDED ARTICLES FOR PHOTOGRAPHIC PHOTO-SENSITIVE MATERIALS

[75] Inventors: Mutsuo Akao; Hiroyuki Osanai, both of Kanagawa, Japan

[73] Assignee: Fuji Photo Film Co., Ltd., Kanagawa, Japan

[21] Appl. No.: 09/225,472

[22] Filed: Jan. 6, 1999

Related U.S. Application Data

[62] Division of application No. 08/059,265, May 11, 1993.

[30] Foreign Application Priority Data

May 11, 1992 [JP] Japan ................................ 4-117758
Jun. 19, 1992 [JP] Japan ................................ 4-161029

[51] Int. Cl.⁷ .............................. C08K 5/10; C08K 5/04; C08K 3/18
[52] U.S. Cl. .................. 524/424; 524/107; 524/315; 524/399; 524/430; 524/442; 524/492
[58] Field of Search .................... 524/107, 315, 524/399, 424, 430, 442, 492

[56] References Cited

FOREIGN PATENT DOCUMENTS

| | | |
|---|---|---|
| 62-172344 | 7/1987 | Japan . |
| 63-193144 | 8/1988 | Japan . |
| 1209134 | 8/1989 | Japan . |
| 2-72347 | 3/1990 | Japan . |
| 2119707 | 11/1983 | United Kingdom . |

OTHER PUBLICATIONS

Database WPI, 89–283461, Derwent Publications Ltd. London GB; & JP–A–1209134 (FUJI) Aug. 22, 1989 (abstract), Database Japio, No. 88–193144, Orbit Search Service, CA, US; & JP–A–63193144(FUJI) Aug. 8, 1988 (abstract).

*Primary Examiner*—Kriellion A. Sanders
*Attorney, Agent, or Firm*—Sughrue, Mion, Zinn, Macpeak & Seas, PLLC

[57] ABSTRACT

A molded article for photographic photosensitive material formed of a molding resin composition consisting essentially of 100 parts by weight of crystalline resin composition comprising crystalline resin and at least lubricant or antistatic agent, 0.001 to 2 parts by weight of antioxidant and 5 to 90 parts by weight of acrylic acid copolymer resin, and a molded article for photographic photosensitive materials formed of a light-shielding thermoplastic resin composition comprising a light-shielding material of which the surface has been treated with a surface-treating material and antioxidant. The molded article can inhibit bleeding out and thermal decomposition of antistatic agent, lubricant and organic nucleating agent, and can prevent various troubles induced therefrom.

18 Claims, 8 Drawing Sheets

MOLDED ARTICLES FOR PHOTOGRAPHIC PHOTO-SENSITIVE MATERIALS

This is a divisional of application Ser. No. 08/059,265 filed May 11, 1993, the disclosure of which is incorporated herein by reference.

BACKGROUND OF THE INVENTION

This invention relates to molded articles for photographic photosensitive materials.

As the molded articles for photographic photosensitive materials, there are packaging films for photographic photosensitive materials, containers for a photographic film cartridge and the like.

A conventional packaging film for photographic photosensitive materials is disclosed in Japanese Patent KOKOKU No. 63-26697, and is composed of a polyester layer, an adhesive layer, an aluminum foil and a polyolefin resin layer containing light-shielding material and nonionic antistatic agent laminated in this order from the outside. Another conventional packaging film for photosensitive materials is disclosed in Japanese Patent KOKOKU No. 2-2700, and contains at least one light-shielding film layer comprising a polymer belonging to polyethylene and more than 1 wt. % of light-shielding material, and more than 50 wt. % of the total polymers belonging to polyethylene is L-LDPE resin. The packaging film is excellent in physical strength and heat sealing properties.

A conventional container body for a photographic film cartridge is disclosed in Japanese Patent KOKAI No. 61-73947, and is formed of a resin composition of polypropylene resin containing 0.05 to 1 wt. % of fatty acid amide lubricant. The container body has various advantages, such as sharp shortening of injection molding cycle, sharp decrease of molding troubles, excellent in slipping character between the container bodies resulting in rare occurrence of abrasion, etc. Another conventional container body for a photographic film cartridge is disclosed in Japanese Utility Model KOKOKU No. 2-33236, and is formed of a polypropylene resin having specific properties containing 0.1 to 3 wt. % of light-shielding material. The container body has also various advantages, such as shortening of injection molding cycle, sharp decrease of molding troubles, great improvement in dropping strength, etc.

However, the above conventional packaging films and cotainer bodies have various problems caused by the migration of antistatic agent or lubricant to the surface of the molded article due to the use of crystalline resin. Moreover, in the case of the container bodies requiring transparency, organic nucleating agent is blended in order to improve the transparency (Japanese Patent KOKOKU No. 4-58616), and they have various problems caused by the migration to the surface or thermal decomposition of the organic nucleating agent. That is, the above packaging films are inferior in the permanence of antistatic properties, and antistatic agent gradually bleed out to induce greasiness, blocking, defective heat seal and the like. When the blending amount of light-shielding material is much, various problems occur, such as adverse affect upon photographic properties, increase of lump generation, defective light-shielding by pinholes generated by the shaking during conveying, and the like.

In the conventional transparent container bodies, fatty acid amide lubricant gradually bleed out of the surface resulting in the decrease of transparency, in the generation of white powder or the like. Organic nucleating agent, antistatic agent and lubricant tend to be oxidized and to decompose with heat in molten resin at a high temperature, and adversely affect photographic photosensitive materials, such as fogging or sensitivity deviation. Lumps and coloring troubles also occur to degrade appearance of molded articles. When the blending amount of light-shielding material is much, various problems occur, such as generation of lumps due to insufficient dispersion of light-shielding material, decrease of dropping strength, degradation of photographic properties, such as fogging and sensitivity deviation. These are particularly problems as the container body for a high sensitivity photographic negative film not less than ISO photographic speed 100.

SUMMARY OF THE INVENTION

An object of the invention is to provide a molded article for photographic photosensitive materials capable of inhibiting bleeding out and thermal decomposition of antistatic agent, lubricant and organic nucleating agent, and capable of preventing various troubles induced therefrom.

Another object of the invention is to provide a molded article for photographic photosensitive materials having a good dispersibility of light-shielding material, small reduction of physical strength, excellent photographic properties, no occurrence of lumps, excellent appearance and complete light-shielding, even though the blending amount of the light-shielding material is much, with ensuring the excellent properties of the above conventional molded articles.

The present invention provides a molded article, which has achieved the above object, formed of a molding resin composition consisting essentially of 100 parts by weight of crystalline resin composition comprising crystalline resin and at least lubricant or antistatic agent, 0.001 to 2 parts by weight of antioxidant and 5 to 90 parts by weight of acrylic acid copolymer resin.

The present invention also provides a molded article, which has also achieved the above object, formed of a light-shielding thermoplastic resin composition comprising a light-shielding material of which the surface has been treated with a surface-treating material and antioxidant.

Figure 1:
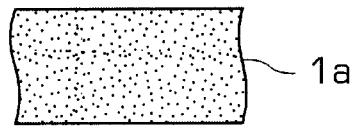
FIG. 1 through 9 are partial sectional views of packaging films for photographic photosensitive materials embodying the invention, respectively.

1a ... Light-shielding thermoplastic resin film layer (molded article for photographic photosensitive materials)

2,2a ... Thermoplastic resin film layer 3,3a ... Intermediate layer

4 ... Adhesive layer

5 ... Flexible sheet layer

9 ... Metallized biaxially stretched film layer

10 ... Metal foil a ... indicating to contain light-shielding material

DETAILED DESCRIPTION OF THE INVENTION

The crystalline resin used in the invention contains one or more of homopolyethylene resin, such as low density polyethylene (LDPE) resin, medium density polyethylene (MDPE) resin and high density polyethylene (HDPE) resin, homopolypropylene resin, propylene- -olefin copolymer resin (random type, block type), ethylene copolymer resin, polyacetal resin, polyamide resin, polyester resin, such as polyethylene terephthalate resin, polyethylene naphthalate resin, polytetrafluoroethylene resin, polyvinyl alcohol resin, or isotactic polystyrene resin, in an amount of more than 50 wt. % in the total. Preferable resins are polyethylene resins and polypropylene resins, particularly preferably LDPE resin, HDPE resin, L-LDPE resin and propylene-ethylene copolymer resin.

Suitable ethylene copolymer resins are ethylene-vinyl acetate copolymer (EVA) resin, ethylene-propylene copolymer resin, ethylene-1-butene copolymer resin, ethylene-butadiene copolymer resin, ethylene-vinyl chloride copolymer resin, ethylene-methylmethacrylate copolymer resin, ethylene-methyl acrylate copolymer (EMA) resin, ethylene-ethyl acrylate copolymer (EEA) resin, ethylene-acrylonitrile copolymer resin, ethylene-acrylic acid copolymer (EAA) resin, ionomer resin (copolymer of ethylene and unsaturated acid crosslinked using metal such as zinc), ethylene- -olefin copolymer (L-LDPE) resin, ethylene-propylene-butene-1 ternary copolymer resin, ethylene-propylene resin elestomer, and the like.

L-LDPE resin is called third polyethylene resin, and it is a low cost high strength resin, having the advantages of both low, medium density polyethylene resin and high density polyethylene resin, which congruent the requirements, i.e. resource conservation and energy conservation, of the times. The L-LDPE resin is a copolymer of ethylene and α-olefin, and it has a linear structure having short branched. The ethylene content is 85 to 99.5 mol. %, and the number of carbon atoms of the α-olefin is 3 to 13. Preferable α-olefin has a number of carbon atoms is 4 to 10, and examples of the α-olefin are butene-1, 4-methylpentene-1, hexene-1, heptene-1, octene-1 and decene-1. The density is usually in the degree of low, medium polyethylene resin and most of commercial resins are in the range of 0.87 to 0.97 g/cm$^3$. Melt flow rate (ASTM D-1238) is mostly in the range of 0.1 to 80 g/10 minutes.

As the polymerization process of L-LDPE resin, there are the vapor process and the liquid slurry process using a medium, low pressure apparatus and the ion polymerization process using an apparatus for the high pressure modified method.

Examples of commercial L-LDPE resin are "G-Resin" and "TUFLIN" (UCC), "NUC Polyethylene-LL" and "TUFTHENE" (Nippon Unicar), "Idemitsu Polyethylene-L" and Moretec (Idemitsu Petrochemical), "Dowlex" (Dow chemical), "Suclear" (Dupont de Nemour, Canada), "Marlex" (Phillips), "Neozex" and "Ultzex" (Mitsui Petrochemical Industries), "Nisseki Linirex" (Nippon Petrochemicals), "Stamilex" (DSM) "Mitsubishi Polyethy-LL" (Mitsubishi Petrochemical), and the like. Preferable L-LDPE resins in view of physical strength, heat seal strength and film moldability are copolymers of ethylene and α-olefin, of which the number of carbon atoms is 6 to 8, having a melt flow rate (MFR) of 0.8 to 10 g/10 minutes (ASTM D-1238) and a density of 0.870 to 0.940 g/cm$^3$ (ASTM D-1505) manufactured by the liquid slurry process or the vapor process. In the case of injection molding, particularly, preferable L-LDPE resin in view of the lealance between the improvement in physical strength and injection moldability are those having a MI of 2–80 g/10 minutes, a density of 0.890–0.980 g/cm$^3$, preferably 0.900 to 0.970 g/cm$^3$, using an α-olefin having a number of carbon atoms of 3–8 manufactured by the liquid slurry process or the vapor process. Very low density L-LDPE resins having a density of less than 0.910 g/cm$^3$ are also preferred, particularly for the surface layer because film rupture, film cracks or pinholes do not occur, even if the layer is thinned with increase in the light-shielding material content.

In the molded article of the invention, it is preferable to blend various known thermoplastic elastomers in an amount of not less than 3 wt. %, preferably 6 to 50 wt. %, particularly preferably 10 to 40 wt. %, for the purpose of the improvement in flexibility, impact strength at low temperature or the like. A particularly preferable thermoplastic elastomer is ethylene-propylene rubber, and as the ethylene-propylene rubber, there are two kinds, i.e. EPM which a copolymer of ethylene and propylene and EPDM which is a ternary copolymer of ethylene, propylene and diene monomer for crosslinking, such as ethylidene norbornene. Since EPM and EPDM do not contain unsaturated bond in their polymer main chain, they are excellent in heat resistance and weather resistance and do not adversely affect photographic photosensitive materials, and therefore particularly preferred.

To the resin film for photographic photosensitive materials which is one of the molded articles of the invention, it is preferable to blend antiblocking agent in order to prevent blocking. As the antiblocking agent, there are silica including natural silica and synthetic silica, calcium carbonate, talc (magnesium silicate), aluminum silicate, calcium silicate, fatty acid amide lubricant, higher fatty acid polyvinyl ester, n-octadecylurea, N,N'-dioleyloxamide, N-ethanolstearic amide, dicarboxylic acid ester amide, etc., and silica is preferred. A suitable blending amount is 0.01 to 5 wt. %. When the blending amount is less than 0.01 wt. %, antiblocking effect is insufficient. When the blending amount exceeds 5 wt. %, not only lump-formed unevenness trouble occurs, but also physical strength and heat sealing properties of the resin film degrade. Preferable silica has a mean particle size of 0.3 to 20 μm. When the mean particle size is less than 0.3 μm, aggregation is liable to occur to generate lumps frequently, and antiblocking effect is small. When the mean particle size is more than 20 μm, the film surface is rough by exposing silica particles, and abrasion is liable to occur on the surface of photographic photosensitive materials.

The lubricant includes fatty acid amide lubricants, unsaturated fatty acid amide lubricants, bis fatty acid amide lubricants, monoalkyl amide lubricants, silicone lubricants, nonionic surfactant lubricants, hydrocarbon lubricants, fatty acid lubricants, ester lubricants, alcohol lubricants, metallic soap lubricants, etc. Examples of the lubricant are as follows:

Saturated fatty acid amide lubricants
Behenic acid amide lubricants: "DIAMID KN" (Nippon Kasei Chemical Co., Ltd.)
Stearic acid amide lubricants: "ARMIDE HT" (Lion), "ALFLOW S-10" (Nippon Oil and Fats Co., Ltd.), "FATTY AMIDE S" (Kao Corp.), "NEWTRON 2" (Nippon Fine Chemical Co., Ltd.), "DIAMID 200" and "DIAMID AP-1" (Nippon Kasei Chemical Co., Ltd.), "AMIDE S" and "AMIDE T" (Nitto Kagaku K. K.), etc.
Hydroxystearic acid amide lubricants
Palmitic acid amide lubricants: "NEWTRON S-18" (Nippon Fine Chemical Co., Ltd.), "AMIDE P" (Nitto Kagaku K. K.), etc.
Lauric acid amide lubricants: "ARMIDE C" (Lion Akzo Co., Ltd.), "DIAMID" (Nippon Kasei Chemical Co., Ltd.), etc.
Unsaturated fatty acid amide lubricants
Erucic acid amide lubricants: "ALFLOW P-10" (Nippon Oil and Fats Co., Ltd.), "NEWTRON-S" (Nippon Fine Chemical Lo., Ltd.), "LUBROL" (I.C.I.), "DIAMID L-200" (Nippon Kasei Chemical Co., Ltd.), etc.
Oleic amide lubricants: "ARMOSLIP-CP" (Lion Akzo Co., Ltd.), "NEWTRON" and "NEWTRON E-18" (Nippon Fine Chemical Co., Ltd.), "AMIDE-0" (Nitto Kagaku K. K.), "DIAMID O-200" and "DIAMID G-200" (Nippon Kasei Chemical Co., Ltd.), "ALFLOW E-10" (Nippon Oil and Fats Co., Ltd.), "FATTY AMIDE 0" (Kao Corp.), etc.
Bis fatty acid amide lubricants
Methylene bis behenic acid amide lubricants: "DIAMID NK BIS" (Nippon Kasei Chemical Co., Ltd.), etc.
Methylene bis stearic acid amide lubricants: "DIAMID 200 BIS" (Nippon Kasei Chemical Co., Ltd.), "ARMOWAX" (Lion Akzo Co., Ltd.), "BISAMIDE" (Nitto Kagaku K. K.), etc.
Methylene bis oleic acid amide lubricants: "LUBRON 0" (Nippon Kasei Chemical Co., Ltd.), etc.
Ethylene bis stearic acid amide lubricants: "ARMOSLIP EBS" (Lion Akzo Co., Ltd.), etc.
Hexamethylene bis stearic acid amide lubricants: "AMIDE 65" (Kawaken Fine Chemicals Co., Ltd.), etc.
Hexamethylene bis oleic acid amide lubricants: "AMIDE 60" (Kawaken Fine Chemicals Co., Ltd.), etc.
Nonionic surfactant lubricants: "ELECTROSTRIPPER TS-2", "ELECTROSTRIPPER TS-3" (Kao Corp.), etc.
Hydrocarbon lubricants: liquid paraffin, natural paraffin, microwax, synthetic paraffin, polyethylene wax (preferably not more than 6,000 of weight average molecular weight), polypropylene wax (preferably not more than 6,000 of weight average molecular weight), chlorinated hydrocarbon, fluorocarbon, etc.
Fatty acid lubricants: higher fatty acids preferably more than $C_{12}$, such as caproic acid, stearic acid, oleic acid, erucic acid and palmitic acid, hydroxy fatty acids, etc.
Ester lubricants: fatty acid lower alcohol esters, fatty acid polyol esters, fatty acid polyglycol esters, fatty acid fatty alcohol esters, etc.
Alcohol lubricants: polyols, polyglycols, polyglycerols, etc.
Metallic soap: metal salts, such as Li, Na, K, Mg, Ca, Sr, Ba, Zn, Cd, Al, Sn, Pb salts, of higher fatty acids, such as lauric acid, stearic acid, succinic acid, stearyl lactic acid, lactic acid, phthalic acid, benzoic acid, hydroxystearic acid, ricinoleic acid, naphthenic acid, oleic acid, palmitic acid, erucic acid, etc., and magnesium stearate, calcium stearate, zinc stearate, magnesium oleate are preferable.
Partially saponified montanic acid esters
Silicone lubricants: dimethylpolysiloxanes, modified thereon, in various grades (Shin-Etsu Silicone, Troay Silicone). Various silicone oils are preferable because of exhibiting an expected effects, such as the improvement in the dispersibility of coloring material, the improvement in coloring power and light-shielding due to the increase of haze by making resin turbid into white and the like, as well as the improvement in resin fluidity, slipping character, etc.

The above silicone oil has preferably a viscosity at ordinary temperature of 50 to 100,000 centistockes, more preferably 5,000 to 30,000 centistockes. Suitable silicone oils are those having modified siloxane bond, such as polydimethylsiloxane, polymethylphenylsiloxane, olefin-modified silicone, amide-modified silicone, amino-modified silicone, carboxyl-modified silicone, α-methylstyrene-modified silicone, polyether-modified silicone modified with polyethylene glycol, polypropylene glycol, etc., olefin/polyether-modified silicone, epoxy-modified silicone, alcohol-modified silicone, etc. Among them, olefin-modified silicone, polyether-modified silicone and olefin/polyether-modified silicone are preferable. The silicone oil improves friction coefficient of molded articles, such as film, in a heated condition, decreases sliding resistance generated during hot plate sealing in an automatic packaging machine and prevents the occurrence of wrinkling. Thereby, the silicone oil provides a basis of producing a film which has a beautiful appearance, a high sealability, and adhesion to an article to be packaged without sagging. It prevent the degradation of gloss by sliding to form a fine sealed portion. In the case of using silicone oil, friction coefficient at high temperature can be not more than 1.4 for sliding heat seal.

Effects of blending silicone oil are, when fiber filler, nonfiber light-shielding material or pigment is blended together, the silicone oil coates their surface to improve their dispersibility. Silicone oil improves the dispersibility of resin, decrease motor load of screw and prevents the occurrence of melt fracture. Slipping character can be ensured sufficiently without blending fatty acid amide which tends to bleed out to generate white powder. A fine sealed portion can be formed by decreasing the friction coefficient of a molded article in heated conditions, improving automatic bag-making ability, and preventing the occurrence of wrinkling at the time of heat sealing and the reduction o gloss by sliding. When light-shielding material is combined, coloring force and light-shielding ability can be improved by making thermoplastic resin turbid into white to increase haze. As a result, light-shielding ability can be ensured, even though the blending amount of light-shielding material which degrades properties is decreased.

A suitable content of the lubricant varies according to the kind. Among the lubricants the most suitable for the molded article of the invention, in the case of the lubricants having a small lubricating ability used for keeping photographic properties as the main object, such as metal salts of fatty acids, a suitable content is 0.03 to 5 wt. %, preferably 0.05 to 3 wt. %, particularly preferably 0.1 to 1.5 wt. %. In the case of the lubricants having a great lubricating ability, being liable to bleed out and affecting photosensitive materials, such as fatty acid amide lubricant and bis fatty acid amide lubricant, a suitable content is 0.01 to 1 wt. %, preferably 0.03 to 0.5 wt. %, particularly preferably 0.05 to 0.3 wt. %.

Antistatic agent applicable to the invention includes:
Nonionic Antistatic Agent:
Alkylamine derivatives:
Polyoxyethylene alkyl amine, tertiary amine e.g. laurylamine, N,N-bis(2-hydroxyethyl cocoamine, N-hydroxyhexadecyl-di-ethanolamine, N-hydroxyoctadecyl-di-ethanolamine, etc.

Fatty acid amide derivatives:
  Oxalic acid-N,N'-distearylamide butyl ester, polyoxyethylene alkyl amide, etc.
Ethers:
  Polyoxyethylene alkyl ether, polyoxyethylene alkyl phenyl ether, etc.
Polyol esters:
  Glycerine fatty acid esters, sorbitan fatty acid esters, 1-hydroxyethyl-2-dodecylglyoxazoline, etc.
Anionic Antistatic Agent:
Sulfonates:
  Alkyl fulfonate ($RSO_3Na$), alkylbenzene sulfonate, alkyl sulfate ($ROSO_3Na$), etc.
Phosphate esters:
  Alkyl phosphate, etc.
Cationic Antistatic Agent:
Cationic amides:
Quaternary ammonium salts:
  Quaternary ammonium chloride, quaternary ammonium sulfate, quaternary ammonium nitrate, e.g. stearamide propyl-dimethyl-β-hydroxyethyl ammonium nitrate, etc.
Ampholytic Antistatic Agent:
Alkyl betaines:
Imidaxolines:
Alkyl imidazolines:
Metal salts:
  $(RNR'CH_2CH_2CH_2NCH_2COO)_2$ Mg {R≧C, R'=H or $(CH_2)_mCOO—,$}etc.
Alkyl alanines:
Conductive resin:
  Polyvinylbenzyl cation, polyacrylic acid cation, etc.

Among them, nonionic antistatic agents are particularly preferred, because adverse affect upon photographic properties and human body is small.

A suitable blending amount of the antistatic agent is 0.01 to 5 parts by weight, preferably 0.05 to 3 parts by weight, particularly preferably 0.1 to 1.5 parts by weight per 100 parts by weight of the crystalline resin composition. When the blending amount is less than 0.01 part by weight, the blending effect is insufficient. When the blending amount exceeds 5 parts by weight, slip between the screw of an extruder and a molten resin is liable to occur resulting in the variation of the ejected resin amount. Greasiness and bleeding out with time are also liable to occur.

A dripproofing substance is incorporated in the molded article for photographic photosensitive materials in order to prevent adhesion of dew and to inhibit the deposition of additives liable to bleed out to form white powder, such as lubricant and antioxidant.

As the dripproofing substance, there are water-absorptive or hygroscopic substance and dripproofing agent, and includes any substance which renders a contact angle of water of less than 45 degrees, preferably less than 35 degrees.

The dripproofing agent includes diglycerine monostearate ester, polyglycerine monopalmitate ester, sorbitan monolaurate ester, sorbitan monoerucate, polyoxyethylene sorbitan fatty acid ester, stearic acid monoglyceride, palmitate monoglyceride, oleate monoglyceride, laurate monoglyceride, polyoxyethylene nonylphenyl ether, sorbitan sesquipalmitate, diglycerine sesquioleate, sorbitol fatty acid ester, sorbitol fatty acid dibasic acid ester, diglycerine fatty acid dibasic acid ester, glycerine fatty acid dibasic acid ester, sorbitan fatty acid dibasic acid ester, sorbitan palmitate, sorbitan stearate, sorbitan palmitate propylene oxide 3 moles adduct, sorbitan palmitate propylene oxide 2 moles adduct, sorbitol stearate, sorbitol stearate ethylene oxide 3 moles adduct, diglycerine palmitate, glycerine palmitate, glycerine palmitate ethylene oxide 2 moles adduct, etc.

The dripproofing agent, the water-absorptive substance and the hygroscopic substance may be combined.

It is preferable to provide the molded article for photographic photosensitive materials containing the dripproofing substance with a surface activation treatment, such as corona discharge, ozone treatment or plasma treatment because of exhibiting dripproof action and antifog action more effectively.

A suitable blending amount of the dripproofing substance is 0.01 to 5 wt. %, preferably 0.1 to 3 wt. %. When the blending amount is less than 0.01 wt. %, antifog effect is insufficient. The effect of inhibiting the deposition in a form of white powder of additives liable to bleed out, such as lubricant and antioxidant is also insufficient. When the blending amount exceeds 5 wt. %, although the antifog effect is sufficiently exercised, the effect increased by increasing the blending amount is little. Moreover, the surface of the molded article becomes greasiness, and dust is liable to adhere. When dust adheres on a photographic film, uneven developing rate trouble occurs.

The crystalline resin composition is composed of the aforementioned crystalline resin, lubricant and antistatic agent, and the blending amount of various additives described later is set based on 100 parts by weight of the crystalline resin composition.

Antioxidant is blended in the molded article for photographic photosensitive materials of the invention. Oxidative degradation tends to occur in polyolefin resin having more $CH_3$ branches due to a greater oxygen absorption. Accordingly, oxidative degradation occurs in the order to more: polypropylene resin>homopolyethylene resin>ethylene-α-olefin copolymer resin: less. Various polyethylene resins (containing ethylene-α-olefin copolymer resins) and various polypropylene resins (containing propylene-ethylene random copolymer resins) being representative crystalline thermoplastic resins are hydrocarbons, and it is considered that when a radical group is produced through dehydration of hydrocarbon in the presence of oxygen, antoxidation proceeds in the following formulas as chain reaction.

RH→Re.

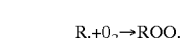

R.+0₂→ROO.

ROO.+RH→ROOH+R.

ROOH→RO.+.OH

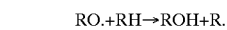

RO.+RH→ROH+R.

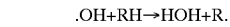

.OH+RH→HOH+R.

Thus, the oxidation of hydrocarbon is accelerated to produce a great quantity of alcohols, aldehydes, acids and the like, and they react with each other to produce polymer. In order to prevent oxidation of hydrocarbon, it is necessary to intercept the above chain reaction, and antioxidant is used for that purpose. Besides, it is also preferable to add the following radical scavenger.

As the radical scavenger suitable for the invention, there are 1,1-diphenyl-2-picrylhydrazyl, 1.3.5-triphenylferudazyl, 2.2,6.6-tetramethyl-4-piperidone-1-oxyl, N-(3-N-oxyanilino-1 3-dimethylbytylidene)anilinoxide, high valency metal salts, such as ferric chloride, diphenylpicrylhydrazine, diphenyamine, hydroquinone, t-butylcatechol, dithiobenzyldisulfide, p.p'-ditolyltrisulfide, benzoquinone derivatives, nitro compounds, nitroso compounds, and the like. Among them, to use hydroquinone is particularly preferred. The above radical scavenger may be used as a single material, or several kinds may be combined. A suitable content of the radical scavenger is 1,000 to 10,000 ppm.

It is particularly preferable to combine phosphoric acid, phosphoric acid compound, citric acid, citric acid compound or the like with at least one of the above antioxidants or radical scavengers because of improving the oxidation inhibition synergistically. A suitable content of the antioxidant synerist (the phosphoric acid, etc.) is 0.001 to 2 wt. %, preferably 0.005 to 1.5 wt. %, particularly preferably 0.01 to 1 wt. %.

As the antioxidant, there are radical group chain terminator which reacts with radical groups, mainly ROO which are chain carriers, to inactivate them, and peroxide decomposer which decomposes hydroperoxide ROOH which is the main source of radical groups, to stabilize it. The radical group chain terminator includes alkylphenol antioxidant and aromatic amine antioxidant. The peroxide decomposer includes sulfur-containing antioxidant and phosphorus-containing antioxidant. It is preferable to combine the radical group chain terminator and the peroxide decomposer, in order to prevent resin yellowing or browning or the generation of lumps caused by the thermal degradation of thermoplastic resin. Since antioxidant is a reducing agent which adversely affects photographic photosensitive materials, unless its kind and the blending amount is carefully examined, degradation of photographic photosensitive materials becomes a great problem.

In order to prevent thermal degradation of thermoplastic resin, particularly polyolefin resin, it is preferable to blend 0.001 to 1 wt. %, preferably 0.005 to 0.8 wt. %, particularly preferably 0.01 to 0.5 wt. % of organic cyclic phosphorus compound as a single material or combined with other antioxidant. As the antioxidant combined therewith, it is preferable to blend 0.001 to 1 wt. %, preferably 0.005 to 0.8 wt. %, particularly preferably 0.01 to 0.5 wt., of phenolic antioxidant, particularly hindered phenolic antioxidant, which has radical group chain terminating action different from the peroxide decomposition action of the cyclic phosphorus compound and rarely affects adversely photographic photosensitive materials. It is also preferable further to blend aforementioned radical scavenger and/or phosphoric acid, citric acid, etc. in addition to the above combination because longer continuous molding becomes possible.

Examples of suitable organic cyclic phosphorus compounds are as follows:

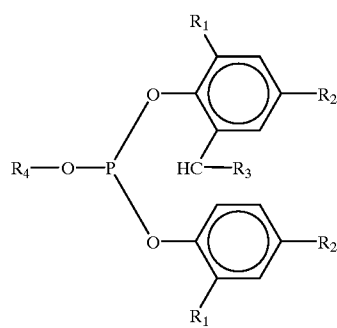

In the formula, $R_1$ represents tertiary butyl group or tertiary amyl group, $R_2$ represents alkyl group having a number of carbon atoms of 1–9, $R_3$ represents hydrogen atom or alkyl group atom or alkyl group having a number of carbon atoms of 1–4, and $R_4$ represents alkyl group having a number of carbon atoms of 1–30 or aryl group having a number of carbon atoms of 6–15.

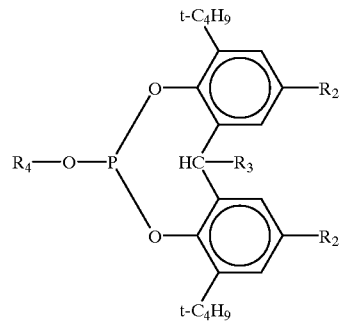

In the formula, the definition of $R_2$, $R_3$ and $R_4$ is the same as above.

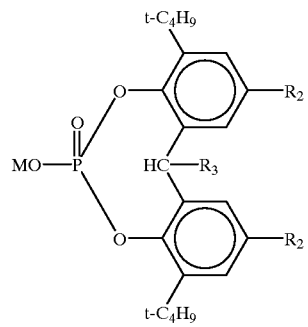

In the formula, the definition of $R_2$ and $R_3$ is the same as above. M represents alkali metal atom.

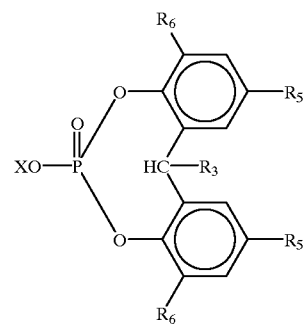

In the above formula, the definition of $R_3$ is the same as above, $R_5$ and $R_6$ represent hydrogen atom, alkyl group, cycloalkyl group, aryl group or alkyl group having a number of carbon atoms of 1–12, and X represents —OH group or —O$^-$NH$_4^+$.

In order to prevent photodegradation of the container for a photographic film, it is preferable to add 0.001 to 5 wt. %, preferably 0.005 to 3 wt. %, particularly preferably 0.01 to 1 wt. %, of ultraviolet absorber. Particularly preferable ultraviolet absorbers are hindered amine ultraviolet absorbers, such as 2.2,6.6-tetramethyl-4-piperidinol, 2.2, 6.6-tetramethyl-4-piperidylbenzoate, etc., and benzophenone salicylic acid compounds, benzotrizaole compounds, ultraviolet absorbers.

Examples of the antioxidant are as follows:

Phenol Antioxidants:

vitamin E (α-tocopherol), 6-t-butyl-3-methylphenol derivatives, 2,6-di-t-butyl-phenol, 2,6-di-t-butyl-p-ethylphenol, 2,6-di-t-butyl-p-cresol (BHT), 2,2'-methylenebis-(4-ethyl-6-t-butylphenol), 2,2-methylenebis-(4-methyl-6-t-butyl-phenol), 4,4'-butylidenebis(6-t-butyl-m-cresol), 4,4'-thiobis(6-t-butyl-m-cresol), 4,4-dihydroxydiphenylcyclohexane, alkyl group-induced bisphenol, styrene group-induced phenol, 2,6-di-t-butyl-4-methylphenol, n-octadecyl-3-(3',5'-di-t-butyl-4'-hydroxyphenyl)propionate, 2,2'-methylenebis(4-methyl-6-t-butylphenol), 4,4'-butylidenebis(3-methyl-6-t-butylphenol), stearyl-β-(3,5-di-4-butyl-4-hydroxyphenyl)propionate, 1,1,3-tris(2-methyl-4-hydroxy-5-t-butylphenyl)butane, 1,3,5-trimethyl-2,4,6-tris(3,5-di-t-butyl-4-hydroxybenzyl) benzene, tetrakis [methylene-3-(3',5'-di-t-butyl-4'-hydroxyphenyl) propionate] methane, etc.

Ketone-Amine Condensae Antioxidants:

6-ethoxy-2,2,4-trimethyl-1,2-dihydroquinoline, polymers of 2,2,4-trimethyl-1,2-dihydroquinoline, trimethyldihydroquinoline derivatives, etc.

Arylamine Antioxidants:

Phenyl-α-naphthylamine, N-phenyl-β-naphthylamine, N-phenyl-N'-isopropyl-p-phenylenediamine, N,N'-diphenyl-p-phenylenediamine, N,N'-di-β-naphthyl-p-phenylenediamine, N-(3'-hydroxybutylidene)-1-naphtylamine, etc.

Imidazole Antioxidants:

2-mercaptobenzoimidazole, zinc salt of 2-mercaptobenzoimidazole, 2-mercaptomethylbenzoimidazole, etc.

Phosphite Antioxidants:

Alkyl-induced arylphosphite, diphenylisodecylphosphite, sodium phosphite salt of tris(nonylphenyl)phosphite, trinonylphenylphosphite, triphenylphosphite, etc.

Thiourea Antioxidants:

Thiourea derivatives, 1,3-bis(dimethylaminopropyl)-2-thiourea, etc.

Other Antioxidants:

Those useful for air oxidation, such as dilauryl thiodipropionate, metal deactivators, etc.

Preferable antioxidants are phenol antioxidants, and particularly effective antioxidants are BHT, low volatile high molecular weight phenol antioxidants ("Irganox 1010", "Irganox 1076", trade names of Ciba-Geigy A. G., "Ionox 330", trade name of Shell, "Good-Rite 3114" trade name of Good-rich, "Topanol C A", trade name of I. C. I., etc.), dilaurylthiodipropionate, distearylthiodipropionate, dialkylphosphate, etc. Two or more antioxidants may be combined.

Particularly preferable antioxidants are hindered phenolic antioxidants because of rare adverse affect upon photographic properties of photographic photosensitive materials. The hindered phenolic antioxidants are 1,3,5-trimethyl-2,4,6-tris(3,5-di-tert-butyl-4-hydroxybenzyl) benzene, tetrakis [methylene(3,5-di-tert-butyl-4-hydroxy-hydrocinnamate) methane], octadecyl-3,5-di-tert-butyl-4-hydroxy-hydrocinnamate, 2,2',2'-tris (3,5-di-tert-butyl-4-hydroxyphenyl)propionyloxy ethylisocyanulate, 1,3,5-tris (4-tert-butyl-3-hydroxy-2,6-di-methylbenzyl) isocyanulate, tetrakis(2,4-di-tert-butylphenyl)-4,4'-biphenylene diphosphite ester, tetrakis[methylene-3-(3,5-di-tert-butyl-4-hydroxyphenyl)propionate] methane, 4,4'-triobis-(6-tert-butyl-o-cresol), 2,2'-thiobis-(6-tert-butyl-4-methylphenol), tris-(2-methyl-4-hydroxy-5-tert-butylphenyl)butane, 2,2'-methylene-bis-(4-methyl-6-tert-butylphenol), 4,4'-methylene-bis-(2,6-di-tert-butylphenol), 4,4'-butylidenebis-(3-methyl-6-tert-butylphenol), 2,6-di-tert-butyl-4-methylphenol, 4-hydroxymethyl-2,6-di-tert-butylphenol, 2,6-di-tert-4-n-butylphenol, 2,6-bis(2'-hydroxy-3'-tert-butyl-5'-methylbenzyl)-4-methylphenol, 4,4'-methylene-bis-(6-tert-butyl-o-cresol), 4,4'-butylidene-bis-(6-tert-butyl-m-cresol) and the like. According to the properties of antioxidants, two or more kinds of antioxidants may be combined. Preferable antioxidants have a melting point of more than 100° C., particularly preferably more than 120° C.

It is preferable to combine at least one kind of a hindered phenolic antioxidants having a melting point of more than 100° C., preferably more than 120° C. which is a representative radical group chain terminator and at least one kind of phosphorus-containing antioxidants, because of enhancing the effect of inhibiting thermal degradation of resins and additives without degrading photographic properties.

Besides, other antioxidants usable in the invention can be selected from those disclosed in "Plastic Data Handbook" (published by Kygyo Chosa Kai), pages 794–799, "Plastic Additives Data Collection" (published by Kagaku Kogyo), pages 327–329, "Plastic Age Encyclopedia, Advance Editions 1986" (published by Plastic Age), pages 211–212, etc.

A suitable blending amount of the antioxidant is 0.0005 to 2 parts by weight, preferably 0.001 to 1 part by weight, particularly preferably 0.005 to 0.45 part by weight per 100 parts by weight of the crystalline resin composition. As the content of the antioxidant in the molded article, 0.0008 to 0.8 wt. % is preferable, and 0.0015 to 0.4 wt. % is particularly preferred.

The acrylic acid copolymer resin includes various ethylene copolymer resins, such as ethylene-acrylic acid copolymer resin, ethylene-methyl acrylate copolymer resin, ethylene-ethyl acrylate copolymer resin, ethylene-butyl acrylate copolymer resin, ethylene-2-ethylhexyl acrylate copolymer resin, ethylene-methacrylate copolymer resin, ethylene-methyl methacrylate copolymer resin, ethylene-ethyl methacrylate copolymer resin and ethylene-butyl methacrylate copolymer resin, and various styrene copolymer resins, such as styrene-methyl acrylate copolymer resin, styrene-ethyl acrylate copolymer resin, styrene-propyl acrylate copolymer resin, styrene-butyl acrylate copolymer resin and styrene-2-ethylhexyl acrylate copolymer resin. Particularly suitable resin is ethylene-ethyl acrylate copolymer (EEA) resin having a MFR of 1 to 250 g/10 minutes, preferably 2 to 50 g/10 minutes, particularly preferably 3 to 30 g/10 minutes and an ethyl acrylate content of 3 to 50 wt. %, preferably 5 to 40 wt. %, particularly preferably 7 to 25 wt. %.

A suitable blending amount of the acrylic acid copolymer is 5 to 90 parts by weight, preferably 10 to 80 parts by weight, particularly preferably 15 to 70 parts by weight, per 100 parts by weight of the crystalline resin composition. As the content of the acrylic acid copolymer in the molded article, 8 to 70 wt. % is preferable, and 12 to 60 wt. %, is more preferred.

When light-shielding ability is imparted to the molded article for photographic photosensitive materials of the invention, light-shielding material may be blended.

Representative examples of the light-shielding material is shown below.

Inorganic Compounds

Oxides . . . Silica, diatomaceous earth, alumina, titanium oxide, iron oxide, zinc oxide, magnesium oxide, antimony oxide, barium ferrite, strontium ferrite, berylium oxide, pumice, pumice balloon, alumina fiber, etc.

Hydroxides . . . aluminum hydroxides, magnesium hydroxides, basic magnesium carbonate, etc.

Carbonates . . . calcium carbonate, magnesium carbonate, dolomite, dawsonite, etc.

Sulfates, sulfites . . . calcium sulfate, barium sulfate, ammonium sulfate, calcium sulfite, etc.

Silicates . . . talc, clay, mica, asbestos, glass fiber, glass balloon, glass bead, calcium silicate, montomorillonite, bentonite, zeolite, etc.

Carbons . . . carbon black, graphite, carbon fiber, carbon hollow bead, etc.

Others . . . iron powder, copper powder, lead powder, tin powder, stainless steel powder, pearl pigment, aluminum powder, molybdenum sulfide, boron fiber, silicon carbide fiber, brass fiber, potassium titanate, lead titanate zirconate, zinc borate, barium metaborate, calcium borate, sodium borate, aluminum paste, etc.

Organic Compounds: wood flour such as pine, oak and sawdust, husk fiber such as almond, peanut and chaff, colored various fibers such as cotton, jute, paper piece, cellophane piece, nylon fiber, polypropylene fiber, various starch (containing modified starch, surface-treated starch, etc.), aromatic polyamide fiber, etc.

Among them, carbon black is preferable because of decreasing the bleeding out of lubricant, surfactant and the like. Carbon blacks are divided into gas black, oil furnace black, channel black, anthracene black, acetylene black, Ketchen carbon black, thermal black, lamp black, vegetable black and animal black according to their origin. Among these, oil furnace carbon black is preferable in terms of photographic properties, light-shielding character, cost and improvement of properties. On the other hand, since acetylene black and Ketschen carbon black which is modified by-produced carbon black have an antistatic character, they are also preferable, though they are expensive. They may be blended to the oil furnace black in order to improve its character. Although, there are various blending method, such as dry coloring, liquid coloring, paste color, masterbatch pellets, compound color pellets and granular color pellets, the masterbatch method using masterbatch pellets is preferred in view of cost and less contamination of the working place. Japanese Patent KOKOKU No. 40-26196 discloses a method of making a masterbatch of polymer-carbon black by dissolving the polymer in an organic solvent and dispersing the carbon black into the solution. Japanese Patent KOKOKU NO. 43-10362 discloses another method of making a masterbatch by dispersing the carbon black into polyethylene.

Particularly preferable carbon black for the molded article for photographic photosensitive materials is the oil furnace carbon black having a pH (JIS K 6221) of 6 to 9, preferably pH 6.5 to 8.5, a mean particle size measured by microscopy of 10 to 120 μm, preferably 12 to 70 μm, a volatile components content (JIS K 6221) of less than 3.5%, preferably less than 1.5%, and a DBP oil absorption value (JIS K 6221) of more than 50 ml/100 g, preferably more than 70 mg/100 g, in view of no occurrence of fogging, rare occurrence of photosensitivity deviation and great light-shielding ability. Moreover, when it is blended in polyolefin resin injection molded articles, polystyrene resin injection molded articles, L-LDPE resin films or the like, the lumps of carbon black and fish eyes rarely occur. Channel black is not preferred because of containing components inducing fogging, such as sulfur component, in quantity and volatile components of frequently exceeding 5%, as well as expensiveness. Lamp black is also not preferable because of having a pH of less than 5 adversely affecting photographic properties. Unless sulfur components of carbon black is less than 0.9%, preferably less than 0.7%, measured by ASTM D-1619-60, photographic properties are adversely affected. Since free sulfur components are particularly adversely affect photographic properties, it is preferable to select carbon black containing free sulfur components of less than 0.1%, preferably less than 0.05%.

As the preferable light-shielding materials, inorganic pigments having a refraction index measured by the Larsen oil immersion method of more than 1.50, various metal powders, metal flakes, metal pastes, metal fibers, and carbon fiber are next to carbon black. Representative examples are titanium oxide in rutile type (2.76), titanium oxide in anatase type (2.52), zinc oxide (2.37), antimony oxide (2.35), lead white (2.09), zinc white (2.02), lithopone (1.84), baryta powder (1.64), barium sulfate (1.64), calcium carbonate (1.58), talc (1.58), calcium sulfate (1.56), silicic anhydride (1.55), silica powder (1.54), magnesium hydroxide (1.54), basic magnesium carbonate (1.52), alumina (1.50), and the like. The number in parenthesis indicates refraction index. Particularly preferable light-shielding materials are inorganic pigments having a refraction index of not less than 1.56, more preferably not less than 1.60. On the other hand, since calcium silicate (1.46), diatomaseous earth (1.45), hydrous silicate (1.44) and the like have a refraction index of less than 1.50, they are unsuitable.

Recently, X-ray checking apparatus is used for baggage inspection at air port. When a high sensitivity photographic film having a sensitivity of ISO photographic speed 400 or more is passed through the X-ray checking apparatus, fogging is liable to occur on the photographic film by X-ray. To blend a light-shielding material having a specific gravity of not less than 3.4 is preferable for preventing the occurrence of fogging by the X-ray.

The light-shielding material having X-ray-shielding ability as well as light-shielding ability has a specific gravity of not less than 3.4, preferably not less than 4.0, and the form may be any form, such as pigment, powder, flake, whisker or fiber. Examples of the light-shielding material having X-ray-shielding ability are barium sulfate, molybdenum disulfide, lead oxide (lead white), iron oxide, magnesium oxide, barium titanate, copper powder, iron powder, silver powder, lead powder, steel powder, zinc powder, tungsten whisker, silicon nitride whisker, copper whisker, iron whisker, nickel whisker, chromium whisker, stainless steel powder and whisker, antimony trioxide, barium carbonate, zinc white, chromium oxide, tin powder, their mixtures, etc. Particularly preferable ones are barium sulfate, barium chloride, barium titanate, lead powder, lead oxide, zinc powder, zinc white, tin powder, stainless steel powder, stainless steel whisker, iron oxide, tungsten whisker, nickel whisker, etc. A suitable content of the X-ray-shielding light-shielding material is 5 to 80 wt. %, preferably 10 to 70 wt. %, particularly preferably 20 to 60 wt. %. In order not to affect adversely photographic photosensitive materials and not to degrade film moldability, the X-ray-shielding light-shielding material is used preferably in a state that weight loss or drying at 100° C. for 5 hours is not more than 2 wt. %, preferably not more than 1 wt. %, particularly preferably not more than 0.5 wt.

As oil-absorptive inorganic pigment having a function of adsorbing lubricant, antioxidant and organic nucleating agent, which are liable to bleed out, deodorant, agent for adding fragrance, oxygen scavenger, etc., there are zinc white (50), asbestine (50), clay (51), talc (60), carbon black (not less than 50) and the like.

The metal powder includes metal paste, and examples are copper powder, stainless steel powder, iron powder, silver powder, tin powder, zinc powder, steel powder and the like.

As the aluminum powder including aluminum paste, aluminum powder of which the surface is coated with a surface-coating material and aluminum paste from which low volatile components are removed and then kneaded with a thermoplastic resin are preferred. The paste of aluminum powder is produced by adding a liquid medium such as mineral spirits or and a small amount of a higher fatty acid such as stearic acid or oleic acid to form a paste at the production of aluminum powder according to a known method such as using a ball mill, a stamp mill or an atomizer. The aluminum paste is kneaded together with an aromatic monovinyl resin, such as polystyrene resin or rubber-containing polystyrene resin, a polyolefin thermoplastic resin, such as various polypropylene resins, various polyethylene resins, acid-modified resins, EVA resin, EEA resin or EAA resin, low molecular weight polyolefin resin, paraffin wax, tackifier, dispersing agent, such as metallic soap, etc. under heat, and volatile components mainly mineral spirits and white spirits are removed by heat, a vacuum pump or the like up to the low volatile component of not more than 3%, preferably not more than 1%, particularly preferably not more than 0.5%. This product is preferably used as aluminum paste compound resin or aluminum paste masterbatch resin. The aluminum paste masterbatch resin is preferable because noxious odors and adverse influences upon the photographic photosensitive materials are eliminated. In order to eliminate noxious odor and adverse influences upon the photographic photosensitive materials, the content of mineral spirits should be less than 0.1 wt. %. When the aluminum paste content of the molded article is made 2 wt. % by using a masterbatch resin containing 40 wt. % of aluminum paste and 1.0 wt. % of mineral spirits, one part by weight of the masterbatch resin is blended with 19 parts by weight of the main resin. Since part of the mineral spirits evaporates during molding, the final conent of the mineral spirits is less than 0.05 wt. %. The aluminum powder includes microflakes produced from aluminum foil which is crushed by a ball mill or a stamp mill, in addition to typical aluminum powder manufactured by atomization, dropping on a rotary disc or evaporation from melted aluminum. Since aluminum powder is unstable, it is stabilized by a known treatment.

A suitable content of the light-shielding material is 0.1 to 20 wt. % in total in order to ensure qualities as goods, photographic properties, moldability and economical view point of the molded article for photographic photosensitive materials of the invention, but it varies according to light-shielding ability. In the case of carbon black and aluminum powder excellent in light-shielding ability, a suitable content is 0.1 to 10 wt. %, preferably 0.15 to 7 wt. %, particularly preferably 0.2 to 5 wt. % in total. When the content is less than 0.1 wt. %, unless the thickness of the molded article is thickened, fogging occurs due to insufficient light-shielding ability. The thickening of the molded article results in the retardation of molding speed due to lengthening cooling time, and the cost increases by the increase of resin. When the content exceeds 20 wt. %, dispersibility becomes worse to generate microgrits (lumps) which induces pressure marks and abrasion on photographic photosensitive materials. Moreover, a water content of the molded article increases by the increase of water adsorbed on carbon black, and adversely affects photographic properties, such as fogging, sensitivity deviation and abnormal coloring, upon photographic photosensitive materials. Furthermore, moldability of the molded article is degraded to induce the occurrence of foaming, silver streaks, pinholes short shot or the like, and physical strength decreases.

It is preferable to coat the surface of a light-shielding material, preferably carbon black, aluminum powder, inorganic pigment having a refractive index of not less than 1.50, inorganic pigment having a specific gravity of not less than 3.4 or inorganic pigment having an oil absorption value of not less than 50 ml/100 g, by surface-coating material, in order to improve the dispersibility into resin and the resin fluidity, to prevent the generation of volatile substances harmful to photographic properties, to decrease hygroscopicity, to prevent fouling of die lip, and the like.

As the surface-coating material, there are lubricant, antioxidant, hydrous aluminum oxide, hydrous silicon dioxide, divalent to tetravalent alcohol, amine compound, surfactant, organic chelate compound, coupling agent, hydrocarbon having a softening point of not more than 90°C., silicone oil, and the like. Two or more of them may be combined.

The lubricant, antioxidant and silicone oil may be selected from the aforementioned ones.

The hydrous silicon dioxide in natural silica and synthetic silica.

The divalent to tetravalent alcohol is ethylene glycol, propylene glycol, 1,3-dihydroxybutane, heptamethylene glycol, trimethylolethane, glycerine, 1,2,6-hexanetriol, etc.

The surfactant may be anyone of nonionic surfactant, anionic surfactant, cationic surfactant and ampholytic surfactant.

The amine compound primary amines, such as ethanol amine, laurylamine and butanolamine, secondary amines, such as diethanolamine and N-methylethanolamine, tertiary amines, such as triethanolamine and N.N-dimethyllaurylamine, and a suitable coating amount is 0.01 to 5 wt. % against light-shielding material.

The organic chelate compound is ethylenediaminetetraacetic acid, N-hydroxyethyl-ethylenediamine-N,N',N"-triacetic acid, diethylenetriaminepentaacetic acid, β-diketone chelate, nitrilotriacetic acid, sodium potassium tartarate, etc.

The coupling agent is silane compound, such as vinyl trichlorosilane, vinyl trimethoxysilane or vinyl triethoxysilane, titanate compound, such as isopropyl-triisostearoyl titanate, etc.

The hydrocarbon having a softening point of not more than 90° C. is EVA resin, EEA resin, EMA resin or EAA resin having a comonomer content of not less than 5 wt. %, homopolyethylene resin having a density of less than 0.92g/cm$^3$, ethylene-α-olefin copolymer resin having a density of less than 0.915 g/cm$^3$, acid-modified polyolefin resin, polyethylene wax, polypropylene wax, cyclopentadiene resin modimodified hydrocarbon resin, etc.

The aforementioned dripproofing agent is also usable as the surface-coating material of the light-shielding material.

The other materials usable as the surface-coating material are organic aluminum compounds, such as aluminum ethylate, aluminum monoacetylacetonate, aluminum bisethylacetoacetate and aluminum trisacetylacetonate, organosiloxanes, such as dimethylsiloxane, diethylsiloxane, methylethylsiloxane, diphenylsiloxane, methyphenylsiloxane, ethylphenylsiloxane, methylhydrogensiloxane, ethylhydrogensiloxane and phenylhydrogensiloxane, acrylic acid compounds, such as ethyleneacrylic acid copolymer, ethylene-ethyl acrylate copolymer and ethylene-methyl acrylate copolymer, and the like.

Representative coating by the surface-coating material are as follows:

(1) Using a coupling agent:

Coated with a coupling agent containing azidosilane compound (disclosed in Japanese Patent KOKAI No. 62-32125).

Coated with a silane coupling agent.

Coated with a titanate coupling agent.

(2) Coated by depositing silica followed by depositing by alumina.

(3) Coated with higher fatty acid metal salt, such as zinc stearate, magnesium stearate or calcium stearate.

(4) Coated with surfactant, such as sodium stearate, potassium stearate or hydroxyethylene dodecylamine.

(5) Coated by reacting barium sulfide aqueous solution with sulfuric acid aqueous solution in the presence of an excess amount of barium ion to produce barium sulfate having a mean particle size of 0.1 to 2.5 μm, adding alkaline silicic acid solution thereto to deposit barium silicate on the surface of the barium sulfate, and depositing hydrous silica on the surface of the barium sulfate produced by the decomposition of the barium silicate by adding mineral acid to the slurry.

(6) Coated with a composition consisting of one or more of the oxides selected from hydrated oxides of metal, such as titanium, aluminum, cerium, zinc, iron, cobalt or silicon, and oxides of metal, such as titanium, aluminum, cerium, zinc, iron, cobalt or silicon.

(7) Coated with a polymer having one or more reactive groups selected from aziridine group, oxiazoline group and N-hydroxyalkylamide group.

(8) Coated with polyoxyalkylene amine compound.

(9) Coated with cerium iron, selected acid amion and alumina.

(10) Coated with alkoxy titanium derivative having α-hydroxycarboxylic acid residue as substituent.

(11) Coated with polytetrafluoroethylene.

(12) Coated with polydimethylsiloxane or modified silicone.

(13) Coated with phosphate ester compound.

(14) Coated with divalent to tetravalent alcohol.

(15) Coated with olefin wax, such as polyethylene wax or polypropylene wax.

(16) Coated with hydrous aluminum oxide.

(17) Coated with silca of zinc compound consisting of zinc chloride, zinc hydroxide, zinc oxide, zinc sulfate, zinc nitrate, zinc acetate or zinc citrate of a combination thereof.

(18) Coated with polyhydroxy saturated hydrocarbon. Others.

A suitable coating amount is 0.001 to 5 wt. %, preferably 0.01 to 3 wt. %, particularly preferably 0.05 to 1.5 wt. %, against light-shielding material, such as carbon black or aluminum powder. When the coating amount is less than 0.001 wt. %, the coating effect is insufficient. When the coating amount exceeds 5 wt. %, bleeding out with time increases. Moreover, screw slip occurs to vary ejected resin amount.

As a surface-coating method, a solution of the surface-coating material is coated on the surface of the light-shielding material by immersing, spraying or the like and then the solvent is evaporated. The surface-coating material may be directly kneaded with the light-shielding material, and this method is suitable, when the surface-coating material is in a liquid or paste state, such as lubricant, surfactant, coupling agent, antistatic agent or the like. The surface-coating material may be kneaded in a melted state with resin and the light-shielding material, and in the method, wetting agent, plasticizer and/or lubricant may be added.

The surface-coated light-shielding material is effective for polyvinyl chloride (PVC) resin, vinylidene chloride-vinyl chloride copolymer (PVDC) resin, ethylene-vinyl alcohol copolymer (EVOH) resin, high impact polystyrene (HIPS) resin and acrylonitrile-styrene-butadiene ternary copolymer (ABS) resin and the like, as well as the aforementioned polyethylene resins, polypropylene resins, polyester resins, polyamide resins, polystyrene resins, etc. The surface-coated light-shielding material is particularly suitable for ethylene copolymer resins for film molding, because of excellent physical strength, heat sealing properties and the dispersibility of light-shielding material is also particularly suitable for various polypropylene resins, polystyrene resin, high impact polystyrene resin and ABS resin for injection molding because of excellent rigidity and injection moldability.

The ethylene copolymer resins suitable for blending the surface-coated light-shielding material are similar to aforementioned, and among them, in the case of using as a film for photographic photosensitive materials. L-LDPE resin and EEA resin are preferable because of no adverse effect on photographic photosensitive materials, excellent film moldability and heat sealing properties, and great bag rupture strength, impact puncture strength and tear strength. The L-LDPE resin is similar to aforementioned.

The EEA resin is not restricted, and commercial EEA resins have, for example, a comonomer content of 7 to 41%, a MFR of 1.5 to 1500 g/10 minutes (ASTM D-1238), a density of 0.93 to 0.95 g/cm$^3$ (ASTM D-1505) a brittle temperature of $-40°$ C. to less than $-75°$ C. (ASTM D-746) and a tensile strength of 14 to 160 kg/cm$^2$ (ASTM D-638).

In the case of blending the surface-coated light-shielding material, the thermoplastic resin to be blended may single resin. However, it is preferable to combine two or more resins, and particularly different in softening point by not less than 10° C. By using the thermoplastic resins different in softening point, various effects are obtained, such as the improvement in the dispersibility of light-shielding material, resin fluidity, mlet adhesion, moldability and the like. Preferable combinations are a polyolefin resin, such as L-LDPE resin, various polypropylene resin including propylene-α-olefin copolymer resin or various homopolyethylene resin different in density, with EVA resin, EEA resin or EMA resin having a comonomer content of not less than 5%, various wax, EAA resin, acid-modified polyolefin resin, tackifier resin, or the like, a non-crystalline resin, such as various polyethylene resin or ABS resin, with EVA resin, EEA resin or EMA resin having a comonomer content of not less than 7%, various low molecular weight polyolefin resin, various wax, EAA resin, acid-modified polyolefin resin, tackifier resin, various elastomer or the like, etc. It is also preferable to blend other thermoplastic resins, various rubbers, various additives, various elastomers, various modifiers, and the like, in order to adjust various properties.

There are various molding methods using an extruder kneading molten resin with ensuring a high physical strength, such as injection molding described later, and various countermeasures are taken against various problems occurring therein. For example, there are the method of improving resin fluidity by raising resin temperature, the method of using a die having multispiral structure. However, the former method has various problems, such as thermal degradation of resin, the generation of lumps and coloring troubles. The latter method has problems that the applicable resins are limited because of special apparatus, that in the case of L-LDPE resin, etc., heat generation and decrease of ejected resin amount occur, that the equipment cost is high to increase the manufacturing cost of products, etc.

The above problems can be resolved by blending 0.001 to 5 wt. %, preferably 0.005 to 3 wt. %, more preferably 0.01 to 1 wt. %, particularly preferably 0.03 to 0.5 wt. % of fatty acid amide, lower alcohol ester of fatty acid, polyvalent alcohol ester of fatty acid, polyglycol ester of fatty acid, various silicone oil, various coupling agent, various fatty acid metal salt, various antistatic agent, various lubricant, various surfactant or the like. Moreover, various improvements can be achieved, such as the improvement in the dispersibility of light-shielding material to improve light-shielding ability and decrease the generation of lumps, the prevention of the degradation of photographic properties, such as the inhibition of fogging, sensitivity deviation and fogging by friction, of photographic photosensitive materials, the prevention of abrasion, melt fracture, fouling of die lip, die lip streaks, wrinkling and the generation of static marks, the improvement in moldability, and the like.

Particularly suitable additives for resolving the above problems are esters of an aliphatic monocarboxylic acid and a monovalent aliphatic alcohol in an amount of 0.001 to 0.5 wt. %. The ester decreases motor load, and improves the dispersibility of light-shielding material and moldability to render the appearance of molded articles beautiful. The ester is composed of an aliphatic monocarboxylic acid having a number of carbon atoms of 20 to 40, preferably 25 to 35 and a monovalent aliphatic alcohol having a number of carbon atoms of 20 to 40, preferably 25 to 35. Examples of the aliphatic monocarboxylic acid are montanic acid, melissic acid, cerotic acid, lacceric acid and the like. Examples of the monovalent aliphatic alcohol are montyl alcohol, melissyl alcohol, lacceryl alcohol, ceryl alcohol and the like. The above esters are also very excellent as the surface-coating material of the light-shielding material because of the improvement in the fluidity of thermoplastic resin and uniform blendability. Moreover, when they are used for coating the surface of the inorganic or organic nucleating agent as the dispersing agent, various excellent effects are exercised, such as the prevention of flying away and bleeding out, and the improvement in dispersibility and resin fluidity and the like.

A suitable total sulfur content (ASTM D-1619) of the above composite light-shielding material is not more than 1%, preferably not more than 0.8%, particularly preferably not more than 0.5%. A suitable free sulfur component is not more than 150 ppm, preferably not more than 50 ppm, particularly preferably not more than 30 ppm, and an ash content according to ASTM D-1506 is not more than 0.5%, preferably not more than 0.4%, particularly preferably not more than 0.3%. A suitable aldehyde compound content is not more than 0.2%, preferably not more than 0.1%, particularly preferably not more than 0.05%, in order to avoid advers affect upon photographic properties. Since cyanides also adversely affect photographic properties of photographic photosensitive materials, it is suitable that the hydrogen cyanide quantity determined by the 4-pyridinecarboxylic acid pyrazolone absorption photometry is not more than 20 ppm, preferably not more than 10 ppm, particularly preferably not more than 5 ppm, converted to the weight of carbon black.

A suitable blending amount of the light-shielding material is 0.01 to 30 wt. %, preferably 0.05 to 20 wt. %, particularly preferably 0.1 to 10 wt. %. When a substance colored by light, such as vitamin E and photosensitive resin, is combined, various effects are greatly exercised, such as the improvement in coloring density, the decrease in the degradation of physical strength, the improvement in melt sealability, in moldability and in resin fluidity. Particularly, in the case that the thickness is not more than 10 μm, a suitable blending amount is 0.1 to 15 wt. %, preferably 0.5 to 10 wt. %, particularly preferably 1 to 7 wt. % in view of ensuring light-shielding and physical strength.

Fatty acid metal salt may be blended into the molded article for photographic photosensitive materials of the invention for the purpose of inactivating substances adversely affecting photographic properties. By blending fatty acid metal salt, various advantages are obtained, such as the decrease of bleeding out, the prevention from flying away of organic nucleating agent and the improvement in the dispersibility of organic nucleating agent. Fatty acid metal salt also improves the dispersibility of light-shielding material and modability, and improves photographic properties by rendering halides harmless by neutralization, which is contained in resin and adversely affect photographic properties. As the fatty acid metal salt, there are combination of lauric acid, stearic acid, lactic acid, succinic acid, stearyl lactic acid, hydroxystearic acid, ricinoleic acid, naphthenic acid, oleic acid, erucic acid or the like and Li, Na, Mg, Ca, Sr, Ba, Zn, Cd, Al, Sn, Pb or the like.

A suitable blending amount of the fatty acid metal salt is 0.01 to 10 parts by weight, preferably 0.1 to 5 parts by weight, per 100 parts by weight of the crystalline resin composition. As the content of the fatty acid metal salt in the molded article, a suitable content is 0.01 to 5 wt. %, preferably 0.03 to 3 wt. %, particularly preferably 0.05 to 1.5 wt. %. When the blending amount is 0.01 wt. %, the blending effect is insufficient. When the blending amount exceeds 5 wt. %, bleeding out occurs. Screw slip also occurs to vary ejected resin amount, and molding troubles frequently occur. Unless blendability is also inferior.

The resin composition used in the invention may be blended with an organic or inorganic nucleating agent.

The organic nucleating agent includes carboxylic acids, dicarboxylic acids, their salts and anhydrides, salts and esters of aromatic sulfonic acids, aromatic phosphinic acids, aromatic phosphonic acids, aromatic carboxylic acids and their aluminum salts, metal salts of aromatic phosphoric acids, alkyl alcohols having a number of carbon atoms of 8 to 30, condensation products of a polyhydric alcohol and an aldehyde, and alkylamines. Examples are aluminum p-t-butylbenzoate, 1,3-benzylidenesorbitol, 1,3,2,4-dibenzylidenesorbitol, the di-substituted benzylidene-sorbitol represented by the following formula;

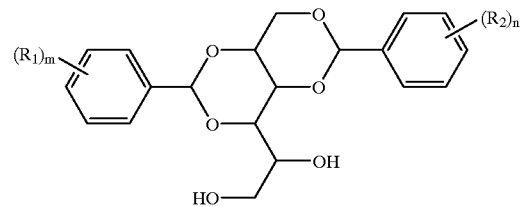

In the formula, $R_1$ and $R_2$ indicate an alkyl group or an alkoxy group having a number of carbon atoms of 1 to 8 or a halogen, and m and n are 0 to 3 and $m+n \geq 1$.
metal salts, such as calcium salt and magnesium salt, of stearyl lactic acid, the compounds, such as N-(2-hydroxyethyl)-stearylamine, represented by the following formula;

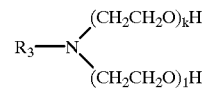

In the formula, $R_3$ indicates an alkyl group having a number of carbon atoms of 8 to 30, and k and l are 0 to 10 and $k+l \geq 1$.

metal salts, such as lithium salt, sodium salt, potassium salt, calcium salt and magnesium salt, of 1,2-dihydroxystearic acid, stearyl alcohol, lauryl alcohol, sodium benzoate, benzoic acid, and sebacic acid.

Among the organic nucleating agent, sorbitol compound is excellent in a great crystallization-accelerating effect, rare adverse affect on photographic properties, the decrease of molding troubles, the shortening of molding cycle and the improvement in rigidity and in appearance.

Examples of the sorbitol compound are as follows:
di-(o-methylbenzylidene)sorbitol
o-methylbenzylidene-p-methylbenzylidene sorbitol
di-(m-methylbenzylidene)sorbitol
m-methylbenzylidene-o-methylbenzylidene sorbitol
di-(p-methylbenzylidene)sorbitol
m-methylbenzylidene-p-methylbenzylidene sorbitol
1.3-heptanylidenesorbitol
1.3,2.4-diheptanylidenesorbitol
1.3,2.4-di(3-nonyl-3-pentenylidene)sorbitol
1.3-cyclohexanecarbylidenesorbitol
1.3,2.4-dicyclohexanecarbylidenesorbitol
1.3,2.4-di(p-methylcyclohexanecarbylidene)sorbitol
Aromatic hybrocarbon groups or derivatives thereof 1.3-benzylidenesorbitol
1.3,2.4-dibenzylidene-D-sorbitol
1.3,2.4-di(m-methylbenzylidene)sorbitol
1.3,2.4-di(p-methylbenzylidene)sorbitol
1.3,2.4-di(p-hexylbenzylidene)sorbitol
1.3,2.4-di(l-naphthalenecarbylidene)sorbitol
1.3,2.4-di(phenylaceylidene)sorbitol
1.3.2.4-di(methylbenzyliden)sorbitol
1.3.2.4-di(ethylbenzylidene)sorbitol
1.3.2.4-di(propylbenzyledene)sorbitol
1.3.2.4-di(methoxybenzylidene)sorbitol
1.3.2.4-di(ethoxybenzylidene)sorbitol
1.3.2.4-di(P-methylbenzylidene)sorbitol
1.3.2.4-di(P-chlobenzylidene)sorbitol
1.3.2.4-di(P-methoxybenzylidene)sorbitol
1.3.2.4-di(alkilbenzylidene)sorbitol
1.3.2.4-di(methylbenzylidene)sorbitol
aluminumbenzoate, etc.

A suitable blending amount of organic nucleating agent is 0.005 to 5 wt. %, preferably 0.01 to 3 wt. %, more preferably 0.03 to 2 wt. %, the most preferably 0.05 to 1 wt. %.

Organic nucleaging agent, particularly sorbitol compounds, is vulky, having a bulk specific gravity of $0.1\pm0.02$, and tends to fly away, and according, it is preferable to combine a fatty acid metal salt because of improving dispersibility, blending effect and decreasing bleeding out, as well as preventing fly away. Preferable fatty acid metal salts have number of carbon atoms of not less than 8. A suitable content of the fatty acid metal salt in the molded article is 0.01 to 5 wt. %, preferably 0.03 to 3 wt. %, particularly preferably 0.05 to 1.5 wt. %. The fatty acid metal salt also improves the dispersibility of light-shielding material and moldability. Moreover, photographic properties are improved by rendering halides harmless by neutralization which adversely affect photographic properties.

In organic nucleaging agent includes an alkali metal hydroxide, such as lithium hydroxide, sodium hydroxide and potassium hydroxide, an alkali metal oxide, such as sodium oxide, an alkali metal carbonate, such as lithium carbonate, sodium carbonate, potassium carbonate, sodium hydrogencarbonate and potassium hydrogencarbonate, an alkaline earth hydroxide, such as calcium hydroxide, magnesium hydroxide and barium hydroxide, an alkaline earth oxide, such as calcium oxide, and an alkaline earth carbonate, such as calcium carbonate.

The nucleating agent is not limited to the above compounds, and any known nucleating agent may be employed. Moreover, two or more nucleating agents may be used simultaneously. A suitable blending amount of inorganic nucleating agent is 0.01 to 5 wt. %, preferably 0.05 to 3 wt. %.

Preferable nucleating agents are organic nucleating agent of dibenzylidenesorbitol compounds, and the di-substituted benzylidenesorbitol compositions described below are particularly preferable for the polyolefin resins, preferably propylene-α-olefin random copolymer resin, homopolyethylene resin having a density of not less than 0.910 g/cm³ and ethylene-α-olefin copolymer resin having a density of not less than 0.870 g/cm³, which belong to the crystalline resin of the invention, in view of the improvement in physical strength, rigidity and film molding speed, the decrease of molding troubles, and the improvement in foreign odor and blending out which are the defects of conventional organic nucleating agent.

The di-substituted benzylidenesorbitol composition contains solid powder of the dibenzylidenesorbitol derivative represented by the following general formula and the following higher fatty acid as the essential components, and the surface of the solid powder of the dibenzylidenesorbitol derivative is coated with the higher fatty acid.

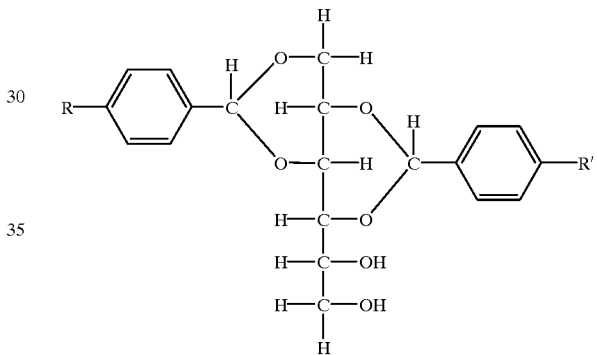

In the formula, R and R' independently represent an atom or a group selected from chlorine atom, methyl group and ethyl group, preferably chlorine atom or methyl group.

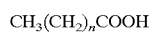

In the formula, n represents a number of 14 to 30, preferably 18 to 27, particularly preferably 20 to 25. Preferable dibenzylidenesorbitol derivatives of the above general formula are 1.3,2.4-di(p-methylbenzylidene)sorbitol, 1.3,2. 4-di(p-ethylbenzylidene)sorbitol, 1.3-p-methylbenzylidene-2.4-p-chlorobenzylidenesorbitol, 1.3-p-methylbenzylidene-2.4-p-ethylenzylidenesorbitol, 1.3-p-chlorobenzylidene-2.4-p-methylbenzylidensorbitol and the like. Particularly preferable dibeyzylidenesorbitol derivatives are 1.3.2.4-di(p-methylbenzylidene)sorbitol, 1.3-p-methylbenzylidene-2.4-p-chlorobenzylidene sorbitol and 1.3-p-chlorobenzylidene-2.4-p-methylbenzyidenesorbitol.

Preferable higher fatty acids are behenic acid, stearic acid and palmitic acid. Behenic acid is the most preferable, and stearic acid is in the second place.

The particle size of the solid powder of the dibenzylidene sorbitol derivative is not particularly limited, but a particle size distribution of 30 to 100 mesh is preferred.

Preferable organic nucleating agent composition contains 95 to 50 parts by weight, preferably 90 to 50 parts by weight, of the dibenzylidenesorbitol and 5 to 50 parts by weight, preferably 10 to 50 parts by weight, of the higher fatty acid so that the total of both components is 100 parts by weight.

The di-substituted dibenzylidenesorbitol can be prepared by adding the solid powder of the dibenzylidenesorbitol derivative to an aqueous emulsion containing the higher fatty acid in the above ratio, stirring to form a coating layer of the higher fatty acid on the surface of the solid powder of the dibeyzylildenesorbitol derivative, filtering out the dibeyzylidenesorbitol derivative powder coated with the higher fatty acid, washing followed by drying. The above aqueous emulsion of the higher fatty acid is prepared by dispersing an organic solvent solution of the higher fatty acid in a concentration of 5 to 50 wt. %, preferably 10 to 50 wt. % into water together with a small amount, such as 1 to 10 parts by weight, preferably 2 to 5 parts by weight, of surfactant. The presence of the higher fatty acid coating formed on the surface of the solid powder of the dibenzylidene sorbitol derivative can be confirmed by coloring the coating using a dye and then observing.

The pobenzylidenesin, to which the di-substituted benzylidenesorbitol composition is blended as and additive in order to improve physical strength and to decrease bleeding out and odor, includes homopolymers and copolymers of aliphatic monoolefin having a number of carbon atoms of 2 to 6, such as homopolypropylene resin, low density homopolyethylene resin, high density homopolyethylene resin, linear polyethylene (ethylene-α-olefin copolymer) resin, ethylene-propylene copolymer resin and the like, having a number average molecular weight of 10,000 to 1,000,000, preferably 15,000 to 500,000, more preferably 20,000 to 200,000, particularly preferably 30,000 to 150,000. The blending effects of the organic nucleating agent are especially exercised on the polyolefin resin having a high crystallinity, not less than 50%, preferably not less than 70%, more preferably not less than 80%, particularly preferably not less than 90%. A suitable molecular weight distribution (weight average molecular weight/number average molecular weight) is 2 to 20, preferably 3 to 15, more preferably 3.5 to 12, particularly preferably 4 to 8.

A suitable blending amount of the di-substituted benzylidenesorbitol composition is 0.005 to 5 parts by weight, preferably 0.01 to 3 parts by weight, per 100 parts by weight of the polyolefin resin.

The di-substituted benzylidenesorbitol composition can be blended into the polyolefin resin by an arbitrary known blending means, and the blend prepared in a high concentration can be used as a masterbatch resin.

In the di-substituted benzylidenesorbitol composition, it is important that the surface of the solid particles of the dibenzylidenesorbitol derivative is coated with the higher fatty acid, and the aforementioned effects cannot be obtained by mere blending of the dibenzylidene sorbitol derivative and the higher fatty acid.

Moreover, in order to obtain the aforementioned effects, a heat history of not less than 180° C., preferably not less than 190° C., particularly preferably not less than 200° C. is necessary. The heat history is sufficient by once. For example, the polyolefin resin composition is blended with 0.01 to 2 wt. % of the above di-substituted benzylidenesorbitol composition, and pelletized with heating at a temperature not less than 180° C., preferably not less than 190° C., particularly preferably not less than 200° C. The pellets are used for molding a light-shielding polyolefin resin film or the like. Even when the molding resin temperature is less than 180° C., the aforementioned effects are obtained, by rendering the molding resin temperature not less than 180° C. (i.e. twice heat history of not less than 180° C.), the molded light-shielding polyolefin resin film is very excellent in physical properties and rigidity, has a high surface gloss and rare occurrence of wrinkling and streaks.

The di-substituted benzylidenesorbitol composition exhibits various advantages compared with conventional organic nucleating agent, such as not degrading various properties, such as physical strength, bleeding out problem and rigidity, but occasionally improving the properties, being excellent in odorless property, resistance to wrinkling and streaks, the improvement in film moldability, film forming speed and the decrease of molding trouble, by blending the polyolefin resin composition. That is, light-shielding molded articles for photographic photosensitive materials excellent in physical strength, rare bleeding out, odorless property, film moldability and wear resistance can be provided by blending the polyolefin resin composition of the invention with the di-substituted benzylidenesorbitol composition.

Although the reason why the di-substituted benzylidenesorbitol composition exhibits the above excellent effects is not clear, it can be considered that benzaldehyde, which is a raw material of conventional dibenzylidenesorbitol, and benzaldehyde derivatives such a p-substituted benzaldehyde, which are a raw material of the dibenzylidene sorbitol derivative of the invention, have odor, and a trace amount thereof unavoidably remains in dibenzylidenesorbitol or its derivative after purification to cause foreign odor of the light-shielding polyolefin resin, and that a small amount of dibenzylidenesorbitol or its derivative is decomposed during molding the light-shielding polyolefin resin film to cause foreign odor. By satisfying the requirement of using the solid particles of the dibenzylidenesorbitol derivative of the aforementioned formula and coating them with the higher fatty acid of the aforementioned formula, the di-substituted benzylidenesorbitol composition exhibits the effect of sharply decreasing the foreign odor of the molded articles of the invention and the effect of improving the aforementioned various properties, such as rigidity and physical strength.

Various organic nucleating agent may be used as a nucleating agent or a combination of two or more organic nucleating agent. The surface of organic and/or inorganic nucleating agent may be coated with various lubricant, such as fatty acid, fatty acid compound or silicone, coupling agent, plasticizer, dispersing agent such as surfactant, wetting agent or the like.

A suitable blending amount of nucleating agent is 0.005 to 5 wt. %, preferably 0.01 to 3 wt. %, more preferably 0.03 to 2 wt. %, particularly preferably 0.05 to 1 wt. % in total. When the blending amount is less than 0.005 wt. %, the blending effects is insufficient. When the blending amount exceeds 5 wt. %, the effect of the excess amount of the nucleating agent is minor. According to the kind of the nucleating agent, it adversely affects photographic photosensitive materials, generates noxious odor, adheres to mold, bleeds out, decreases dropping strength, or the like.

As the method of blending the nucleating agent, there are the compound method, the dry blending method, the masterbatch method, and the like, and the masterbatch method is preferred. It is preferable to blend at the time of producing coloring masterbatch, in view of cost and workability. Since the nucleating agent is bulky and tends to fly away, to blend a small amount of dispersing agent or wetting agent is preferred. Suitable dispersing agents include various lubricants, various low molecular weight polyolefin resins having a weight average molecular weight of 500 to 10,000, various waxes, various carboxylic acid anhydrides, various higher fatty acids, etc., and lubricants such as various fatty acid metal salts, various silicones and oleic amide are particularly preferred. As the wetting agent, plasticizers such as DOP and DHP can be used.

It is also preferred to prevent the bleeding out by coating or blending a fatty acid or a fatty acid compound, such as a higher fatty acid, a fatty acid amide or a fatty acid metal salt onto or with the organic nucleating agent. Furthermore, the blending effect of the nucleating agent is improved by using in a form of pellets formed by blending with a polyolefin resin having a heat history at not less than 180° C., preferably not less than 190° C., particularly preferably not less than 200° C. By blending these additives, physical strength is improved, white powder generation caused by abrasion can be decreased by increasing rigidity, and white powder generation caused by crystallization or bleeding out of the organic nucleating agent can also be decreased. Moreover, uncomfortable odor of the organic nucleating agent is prevented, and antistatic ability and antiblocking ability are improved. In this case, it is preferable to blend the aforementioned various antioxidant in order to prevent the degradation, oxidative decomposition and coloring of the above various dispersing agent and various thermoplastic resin.

By blending the nucleating agent, various effects are obtained. For example, by blending 0.1 part by weight of p-t-butylbenzoate as the nucleating agent with 100 parts by weight of propylene-ethylene copolymer resin which is crystalline thermoplastic resin, haze can be decreased from 40% to 21%. When 0.2 part by weight is blended, haze is further decreased to 12%. By blending 0.1 part by weight, tensile yield stress can be improved from 380 kg/cm$^2$ to 420 kg/cm$^2$. Although a further amount is blended, the tensile yield stress is improved scarcely. When 0.1 part by weight is blended, bending elastic modulus is improved by 500 to 600 kg/cm$^2$. Although a further amount is blended, the bending elastic modulus is improved scarcely.

The following additives may be added to the resin composition of the invention.
(1) Plasticizer; phthalic acid esters, glycol ester, fatty acid esters, phosphoric acid esters, etc.
(2) Stabilizer; lead compounds, cadmium compounds, zinc compounds, alkaline earth metal compounds, organic tin compounds, etc.
(3) Flame retardant; phosphoric acid esters, phosphoric acid ester halides, halides, inorganic materials, polyols containing phosphor, etc.
(4) Filler; alumina, kaolin, clay, zeolite, calcium carbonate, mica, talc, titanium oxide, silica, etc.
(5) Reinforcing agent; glass lobing, metallic fiber, glass fiber, glass milled fiber, carbon fiber, etc.
(6) Blowing agent; inorganic blowing agents (ammonium carbonate, sodium hydrogen carbonate), organic blowing agents (nitroso compounds, azo compounds) etc.
(7) Vulcanizing; vulcanization accelerator, acceleration assistant, etc.
(8) Deterioration preventing agent, ultraviolet absorber, metal deactivator, peroxide decomposing agent, etc.
(9) Coupling agent; silane compounds, titanium compounds, chromium compounds, aluminum compounds, etc.
(10) Various thermoplastic resins, polyolefin, elastomers, rubbers.

The following plasticizer may be blended into the molded article for photographic photosensitive materials in order to improve uniform dispersibility of the light-shielding material.

(1) Phthalic acid plasticizer
dibutyl phthalate, diheptyl phthalate, dioctyl phthalate, diisodecyl phthalate, butyl lauryl phthalate, ditridecyl phthalate, butyl benzyl phthalate, butyl phthalyl butyl glycolate, etc.
(2) Phosphoric acid plasticizer
tricresyl phosphate, trioctyl phosphate, etc.
(3) Fatty acid plasticizer
tri-n-butyl citrate, dioctyl adipate, dioctyl azelate, dioctyl sebacate, methyl acetyl ricinoleate, etc.
(4) Epoxy plasticizer
alkyl epoxy stearate, 4,5-epoxytetrahydrodiisodecyl phthalate, etc.
(5) Other plasticizer
chlorinated paraffin, polyester, sucrose octacetate, etc.

A suitable blending amount of the plasticizer is 0.01 to 10 wt. %, preferably 0.05 to 7 wt. %, particularly preferably 0.1 to 5 wt. %. When the blending amount is less than 0.01 wt. %, the blending effects of the improvement in the uniform dispersibility of light-shielding material and in the blocking adhesion is insufficient. When the blending amount exceeds 10 wt. %, screw slip occurs in an extruder resulting in the variation of ejected resin amount.

As the deodorant, there are organic carboxylic acids, mixtures of organic carboxylic acid and zinc compound, mixtures of organic carboxylic acid, zinc compound and aluminum compound, etc.

The organic carboxylic acids include aliphatic polycarboxylic acids, aromatic polycarboxylic acids, acidic polyester compounds which are reaction product of the aliphatic or aromatic polycarboxylic acid and polyol compound and has a carboxyl group at terminal(s), etc. As the aliphatic polycarboxylic acids, there are various di-or tri-carboxylic acids, such as oxalic acid, malonic acid, succinic acid, adipic acid, fumaric acid, methylfumaric acid, maleic acid, methylmaleic acid, itaconic acid, acetylenic acid, malic acid, methylmalic acid, citric acid, isocitric acid, mesaconic acid, citraconic acid and their salts, and the like, and citric acid and fumaric acid and their salts are particularly preferred. As the aromatic polycarboxylic acids, there are phthalic acid, terephthalic acid, isophthalic acid, trimellitic acid pyromellitic acid, benzenehexatricarboxylic acid, naphthalene dicarboxylic acid, naphthalene tricarboxylic acid, naphthalene tetracarboxylic acid, azobenzene tetracarboxylic acid, and their anhydrides and the like, and benzene tricarboxylic acid and trimellitic acid are particularly preferred. As the acidic polyester compound having a carboxylic group at a terminal, there are polyesters having a terminal carboxyl group produced by the reaction of polycarboxylic acid such as phthalic acid with polyol such as ethylene glycol or diethylene glycol, acidic cellulose derivatives modified with polycarboxylic acid, and the like.

The zinc compound combined with the organic carboxylic acid includes zinc oxide, inorganic zinc salts, such as zinc chloride, zinc sulfate, zinc phosphate and zinc carbonate, and organic zinc salts, such as zinc citrate and zinc fumarate. A suitable mixing ratio of organic carboxylic acid:zinc compound is 1:0.1–3 by weight ratio.

The aluminum compound combined with the organic carboxylic acid and the zinc compound includes aluminum sulfate and potassium alum, and a suitable mixing ratio of organic carboxylic acid : zinc compound : aluminum compound is 1:0.1:0.1 to 1:3:3 by weight ratio.

As the oxygen scavenger, there are sulfites hydrogen sulfites, dithionates, hydroquinone, catechol, resorcin, pyrogallol, gallate, ascorbic acid, ascorbate, isoaccorbic acid, isoascorbate, glucose, lignin, dibutylhydroxytoluene, butylhydroxyanisole, ferrous salts, metal powders such as iron powder, carbon dioxide-generating type oxygen scavengers, carbon dioxide-absorbing type oxygen scavengers, cristobalite, zeolite, hydrosulfite, glucose oxidase, sarcosine, alkali metal sulfides, alkali carbonates, sodium thiosulfate, sodium alum, disodium hydrogen phosphate.12 hydrates, hydrous sodium silicate, hydrous sodium borate, ferrous silicate sulfates.7 hydrates, activated clay, mordenite, and the like. The oxygen scavenger may be used as a single material or a combination of them. Preferable oxygen scavengers are those containing hydrosulfite as the principal component, those containing organic material such as L-ascorbic acid as the principal component, those containing iron powder as the principal component, mixture compositions of iron and at least one material selected from the group consisting of ferrous silicate sulfate.7 hydrate, sodium alum, disodium hydrogen phosphates.12 hydrates, hydrous sodium silicate and hydrous sodium borate, hydrosulfite and calcium hydroxide or sodium bicarbonate and activated carbon, iron powder, accelerating salt and hydrous material, oxidizable metal powder and sodium thiosulfate and solid reaction assistant, iron powder and sodium thiosulfate and activated carbon, activated iron oxide, metal oxides, palladium, sugars, enzymes, and the like.

As the moisture absorber, there are water-absorptive resins containing carboxyl group, alkali metal salts of crosslinking polyacrylate, ethylene copolymer resins containing carboxyl group, alkali metal salt of acrylate-graft starch crosslinking agent, crosslinked polyvinyl alcohol-alkali metal salt of acrylate copolymer, crosslinked polyvinyl alcohol-maleic anhydride copolymer, modified celluloses, water-soluble polymer crosslinking agent, self-crosslinking type alkali metal salt of acrylate copolymer, polyacrylic acid and alkali salts thereof, polyacrylamide and partial hydrolyzate thereof, polyvinyl pyrrolidone, sulfonated polystyrene, polyacrylamide-2-methylpropane sulfonic acid sodium salt, graft copolymer of starch-acrylonitrile and hydrolyzate thereof, hydrolyzate of polyacrylonitrile, copolymer of acrylamide and acylic acid, carboxymethyl cellulose, vinyl styrene sulfonic acid, Mannich reaction product of polyacrylamide, polyacrylamine, dimethylaminoethylmethacrylate homopolymer and copolymer thereof with acrylamide, homopolymer of quaternary ammonium salt of dimethylaminoethylmethacrylate produced by methyl chloride and copolymer thereof with acrylamide, quaternary ammonium salt of polydimethylallylamine, polymer of quaternary vinyl benzlamine, acetylating agent of chitosan, condensation product of epichlorohydrin and polyvalent amine or monoamine, resin prepared by adsorbing polyamide polyamine epichlorohydrin thermosetting resin on the surface of high water-absorptive resin beads followed by thermosetting, copolymer of hydrophilic vinyl monomer (acrylamide derivative, etc.) and hydrophobic vinyl monomer (methacrylate derivative, etc.), sodium salt of isobutylene-maleic anhydride copolymer, sodium salt of starch and acrylic acid and acrylic acid derivative graft copolymer, partially crosslinked carboxymethyl cellulose-polybasic acid, partially crosslinked polyacrylic acid, surface-coated high water-absorptive polymer, blends of high water-absorptive polymer and inorganic material (attapulgite, kaolin, talc, diatomaceous earth, etc.), mixture of high water-absorptive resin having anionic dissociative group and high water-absorptive resin having cationic dissociative group, starch-acrylic acid-sodium acrylate copolymer, starch-sodium acrylate copolymer, etc. Preferable moisture absorbers are produced from starch, cellulose or synthetic polymer having a great water absorbability.

It is preferable to add inorganic material having ion-exchange ability in order to adsorb gases which adversely affect photographic properties of photographic photosensitive materials to render harmless, to improve dispersibility by combining light-shielding material, to react with unfavorable odor substances to render odorless. As the inorganic material having ion-exchange ability, there are ① various zeolite including natural zeolite, such as analcime, erionite or mordenite, and synthetic zeolite in a type of A, N-A, X, Y, hydroxy sodalite, B, R, T, hydroxy cancrinite or the like, having a mean particle size of 0.1 to 7 μm, preferably 0.1 to 5 μm, particularly preferably 0.1 to 3.5 μm, and a suitable content in the resin composition being 0.1 to 10 wt. %, preferably 0.2 to 8 wt. %, particularly preferably 0.3 to 6 wt. %, and exercising various effects, such as the improvement in dispersibility, deodorization effect and adsorption of harmful gases to photographic properties, by combining light-shielding material, ② diatomaceous earth, ③ activated clay, ④ synthetic aluminum silicate, ⑤ synthetic calcium silicate, ⑥ synthetic magnesium silicate, ⑦ mica, ⑧ chelating material, etc. Examples of the chelating material are carboxylic acid-type phthalocyanine metal complex, such as metal phthalocyanine tetracarboxylic acid and metal phthalocyanine octacarboxylic acid, iminodiacetic acid-type chelate resin, aminocarboxylic acid-type chelate resin (ethylenediamine-tetraacetic acid (EDTA), etc.), polyamino-type chelate resin, glucamine-type chelate resin, carrier-type chelate resin, 4-dimethylamino-2.6-pyridine dicarboxylic acid chelate resin, and the like. A suitable blending amount of the inorganic material having ion-exchange ability is 0.01 to 10 wt. %, preferably 0.05 to 8 wt. %, more preferably 0.1 to 6 wt. %. When the blending amount is less than 0.01 wt. %, the blending effect is insufficient. When the blending amount exceeds 10 wt. %, the effect obtained by the excess amount is small. Moreover, the decrease of physical strength and the degradation of appearance occur.

The agent imparting fragrance are natural fragrant components, such as ethereal oil of lilac flower, jasmine, abies oil, cinnamon oil, lavender oil and lemon oil, and synthetic fragrant components, such as geraniol, eugenol, n-octyl alcohol, carbitol, cis-jasmone, lemon terpene, menthone, methylsalicylate, methylphenylcarbinol, triethyl citrate, benzyl benzolate, citral, d-limonene, ethylcinnamate, alkylene glycol, benzylsalicylate, linalool, varillin, coumarin, methyl naphthyl ketone and rose phenone, which are used by encapsulating to form microcapsules or entrapping by cyclodextrin, maltosyl cyclodextrin, zeolite, starch, talc or the like.

One or more of the oxygen scavenger, deodorant, moisture absorber, the agent imparting fragrance or inorganic material having ion-exchange ability (including chelating material, and a suitable content is 0.01 to 20 wt. %, preferably 0.05 to 10 wt. %, more preferably 0.1 to 5 wt. %.

Taking into consideration the case of reclamation treatment as waste, degradable plastic which is being developed or has already introduced in the market can be used. For example, a biodegradable polymer of "BIOPOL" (ICI), "Polycaprolactone" (UCC) or the like is utilized, or a polymer indirectly collapsed by blending a biodegradable natural or synthetic polymer as an additive, such as polyethylene blended with starch, can be utilized. In order to improve industrial waster treatment, it is also preferable to blend a recently commercialized synthetic biodegradable plastic which can be decomposed up to carbon dioxide and water by the action of microorganisms ("Bionol", Showa Polymer, which is a special polyester resin synthesized from dicarboxylic acid and the like, a polymer alloy of modified polyvinyl alcohol having biodegradability and maize starch) in an amount of not less than 10 wt. % of the resin composition for the molded article of the invention. In the case of a multilayer molded article, it is preferable so that the layer(s) which do not contact directly photographic photosensitive materials contain not less than 50 wt. % of the above biodegradable plastic in view of the improvement in industrial waste treatment.

Moreover, it is also possible to utilize a photodegradable polymer, such as ELO copolymer wherein carbonyl groups are introduced into the main chain as a photosensitization group at the time of polymerization of ethylene, i.e. copolymerization of ethylene and carbon monoxide, polymers to which photodegradability is imparted by adding transition metal salt, oxidation accelerator, photosensitizer or the like to base polymer. It is also possible to combine degradable polymers, such as biodegradable polymer, photodegradable polymer and water-soluble polymer (Japanese Patent KOKAI No. 3-129341).

Representative examples of the molded article for photographic photosensitive materials of the invention formed by molding the above resin composition are as follows:

Films: Single layer films (FIG. 1, Japanese Patent KOKOKU No. 2-2700, etc.), coextruded multilayer films (FIGS. 2, 3), laminated films using a single layer film or a coextruded multilayer film (FIGS. 4–7, Japanese Patent KOKOKU Nos. 63-26697, 2-2701, 2-13774, 2-19225, etc.), packaging materials using the above flexible sheet of the single layer film, coextruded multilayer film or laminated film, such as packaging bags (unipack bag, single sheet flat bag, double sheet flat bag, single sheet gusset bag, double sheet gusset bag, etc.), shrink packaging, bulk packaging (Japanese Patent KOKAI No. 3-53243, Japanese Utility Model KOKAI No. 3-71346, etc.), assembly packaging, and the like and package for light room loading of a band form photosensitive material (Japanese Utility Model KOKAI Nos. 55-113543, 60-13386, 60-167796, 2-72347, 3-47547, 3-54937, 3-86358, 3-96648, etc.)

Vacuum-molded articles:
Injection-molded articles: spool for photographic film, film unit with lens, container for photographic film cartridge, light-shielding container, cartridge for photographic film, light-shielding magazine for light room loading, core, photographic film cartridge, pack for instant film, etc.

Cartridge for disc film: Japanese Utility Model KOKAI No. 60-21743, etc.

Figure 12:
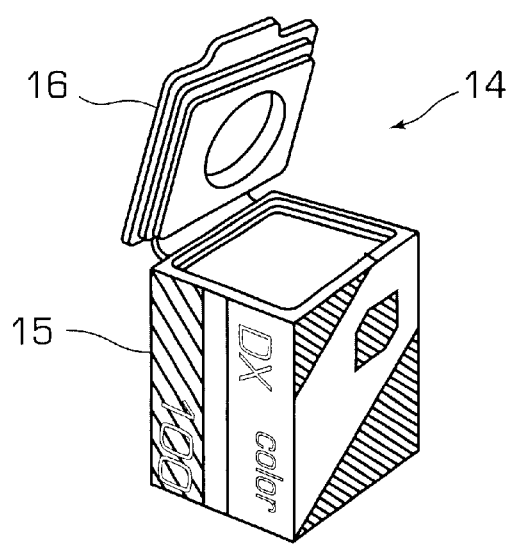
FIG. 12 is a perspective view of a cap-body integrated type container for a photographic film embodying the invention.

Film unit with lens: Japanese Patent KOKAI No. 63-226643 (FIG. 12)

Figure 10:
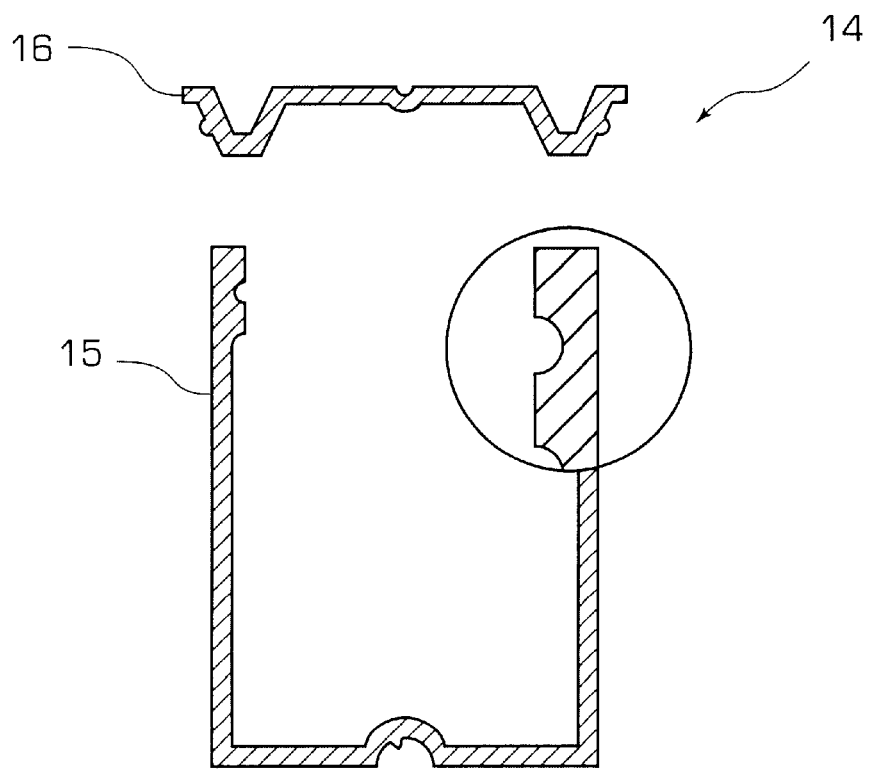
FIGS. 10 and 11 are sectional views of a cap separated from body-type container for a photographic film embodying the invention.

Spool for photographic film: Japanese patent KOKAI Nos. 1-251030, 57-196218, 59-15049, 58-203436, 58-82237, 58-82236, 62-240957, Japanese Utility Model KOKAI Nos. 63-73742, 54-120931, 58-178139-178145, 63-73742, Japanese Utility Model KOKOKU Nos. 55-31541, 44-16777, U.S. Pat No. 1,930,144, GB 2199805A (FIG. 10)

Figure 11:
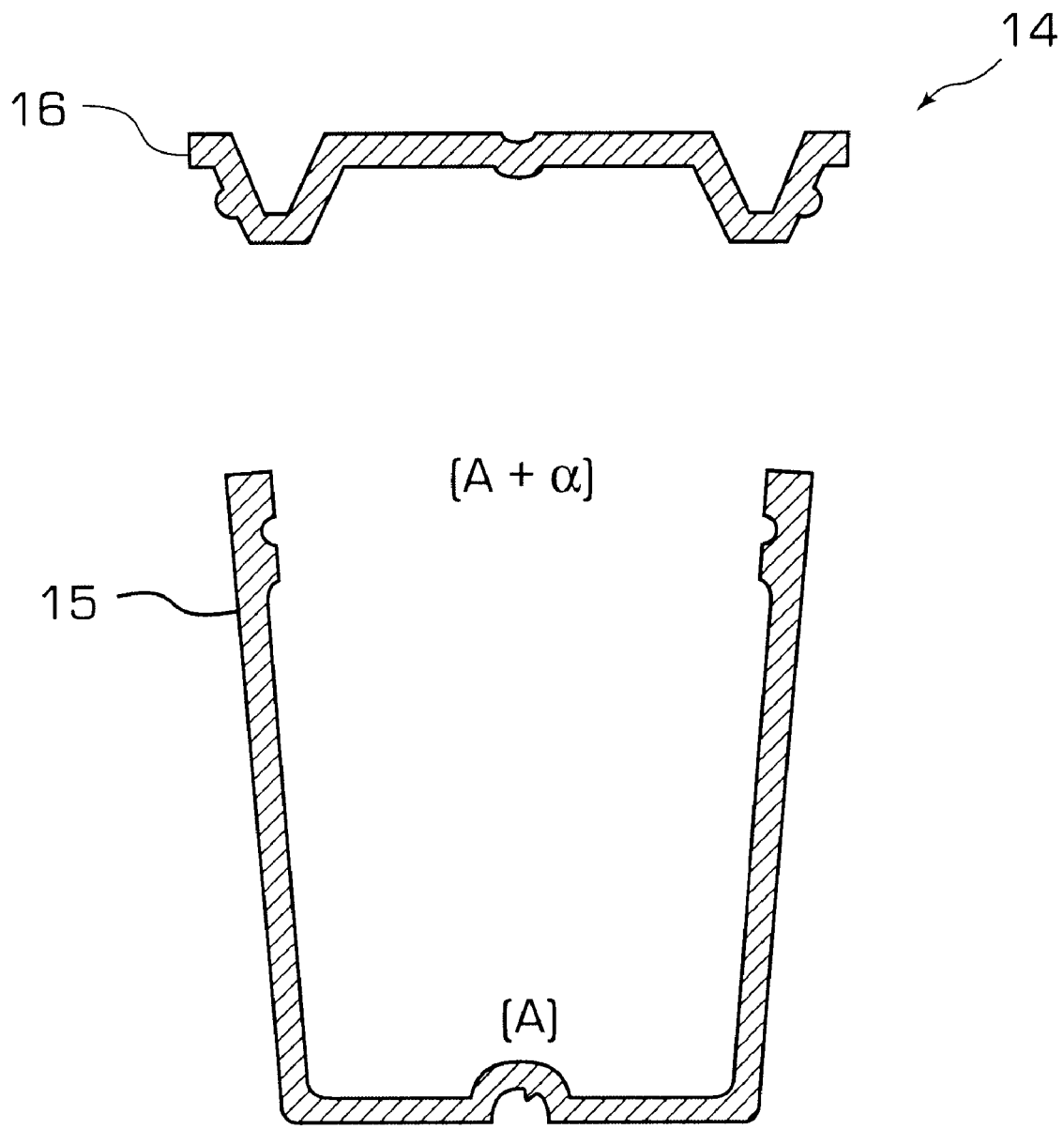

Cartridge for photographic film: Japanese Patent KOKAI Nos. 54-111822, 50-33831, 56-87039, 1-312538, 57-190948, Japanese Patent KOKOKU Nos. 45-6991, 55-21089, Japanese Utility Model KOKAI No. 55-97738, U.S. Pat No. 4,846,418, U.S. Pat No. 4,848,693, U.S. Pat No. 4,887,776, etc. (FIG. 11)

Figure 8:
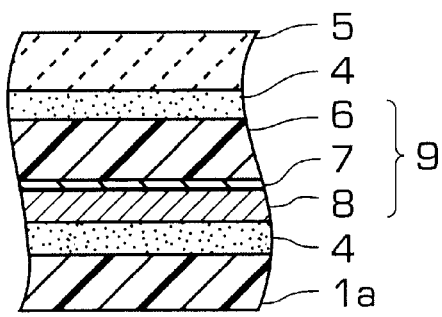
Figure 9:
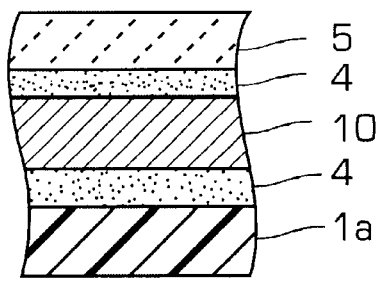

Container for photographic film cartridge: Japanese Patent KOKAI Nos. 61-250639, 61-73947, 63-121047, 62-291639, Japanese Utility Model KOKAI Nos. 60-163451, 1-88940, 1-113235, 1-152337, Japanese Utility Model KOKOKU Nos. 2-33236, 3-48581, Japanese Patent KOKOKU No. 2-38939, U.S. Pat No. 4,801,011, U.S. Pat No. 4,979,351, EP 0237062A2, EP 0280065A1, EP 0298375A2, etc. (FIGS. 8, 9)

Core, Reel: Japanese Utility Model KOKAI No. 60-107848, U.S. Pat No. 4,809,923, GB 2,033,873 B, etc.

Magazine for sheet films: Japanese Utility Model KOKAI No. 56-5141, etc.

Figure 14:
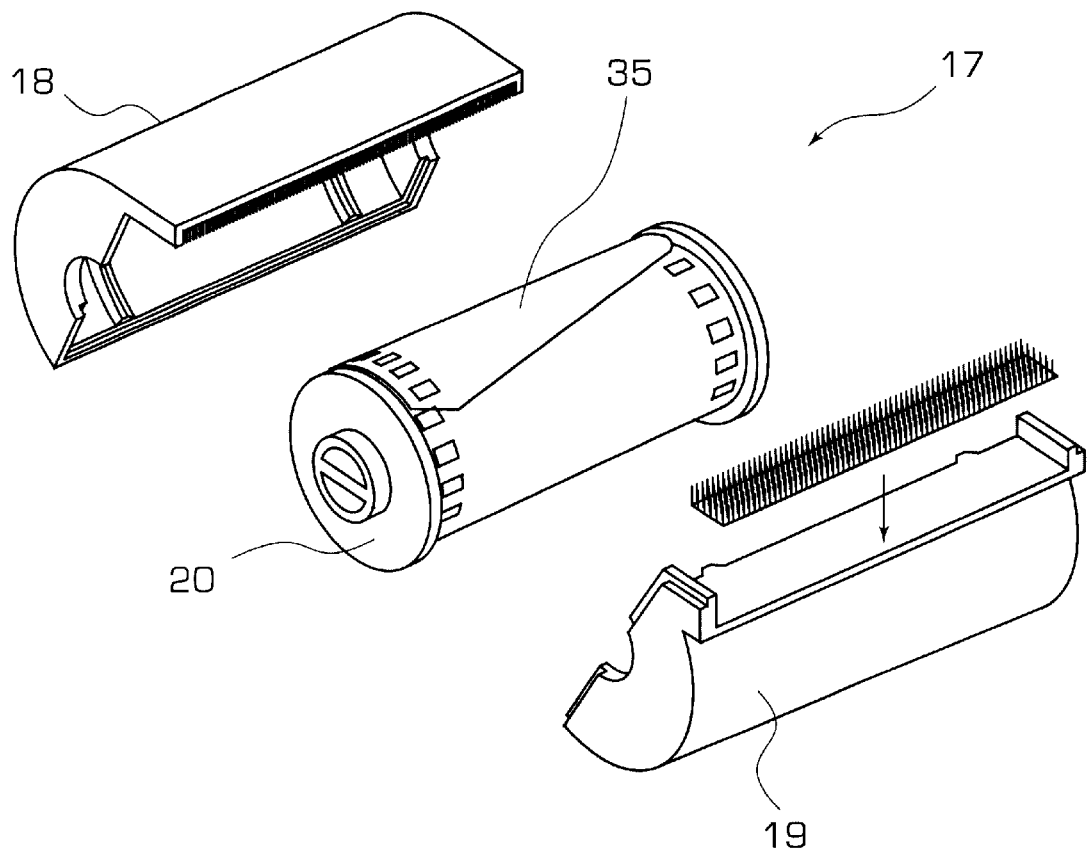
FIG. 14 is an exploded perspective view of a photographic film cartridge made of resin embodying the invention.

Photographic film cartridge: Japanese Patent KOKAI No. 1-312537, Japanese Utility Model KOKAI Nos. 2-24846, 2-29041, 60-120448, Japanese Utility Model KOKOKU No. 56-16610, etc. (FIG. 14)

Figure 13:
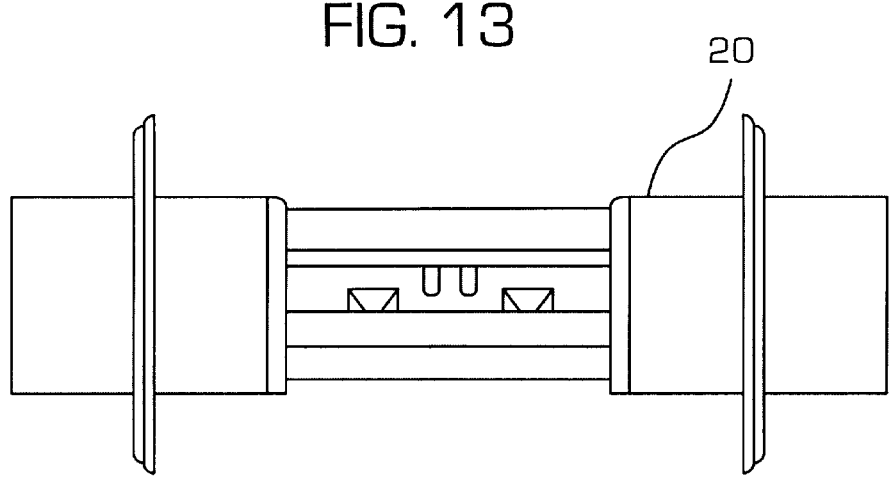
FIG. 13 is a front view of a spool for a photographic film embodying the invention.

Photographic film case: Japanese Utility Model KOKAI No. 54-100617, 64-32343, 1-94258, 2-56139, Japanese Patent KOKOKU No. 2-54934, U.S. Pat. No. 4,779,756, EP 0242905A1, etc. (FIG. 13)

The method of forming the molded article for photographic photosensitive materials may be selected from inflation film molding, injection molding vacuum molding, sheet forming, T die flat film molding, pressure forming, rotational molding, intermold vacuum injection molding and the like, according to the form of each article to be molded.

The molded article of the invention may be provided with letters and marks which are required on the functional view point or with print in order to improve the value as commercial goods. The ink used for printing them can be selected from harmless inks to photosensitive materials among conventional inks for offset printing, inks for gravure printing or UV inks.

Representative synthetic resins used or the inks are vinyl chloride copolymer resins, vinyl-amino resin, alkyd-vinyl resin, oil-free alkyd resin, vinyl chloride-vinyl acetate copolymer resins, nitrocellulose, polyester, polyamide-urethane, polyacrylic resin, rosin-modified maleic acid resin, ethylene-vinyl acetate resin, vinyl ether resin, urethane vinyl acetate resin, vinylchloride-vinylacetate copolymer urethane resin, modified alkyd resin, modified phenol resin, high molecular weight polyester-amino resin, low molecular weight polyester-amino resin, alkali-soluble resins (rosin-modified maleic acid resin, styrene-maleic acid resin, styrene-acrylic acid resin, acrylate ester-acrylic acid resin, methacrylate ester-acrylic acid resin), hydrosol type resins (styrene-maleic acid resin, styrene-acrylic acid resin, α-methylstyrene-acrylic acid resin, acrylate ester-acrylic acid resin, methacrylate ester-acrylic acid resin), emulsion type resins (styrene resin, styrene-acrylate ester resin, acrylate ester copolymer resins, methacylate ester copolymer resins), and the like. As the resins used for UV ink, polymers having acrylic unsaturated groups are, in general, used, and representative examples are polyester/acrylate ester, polyester/urethane resin/acrylate ester, epoxy resin/acrylate ester, pentaerythritol triacrylate, trimethylol propane triacrylate, hexanediol diacrylate, neophentylglycol diacrylate, triethylene glycol diacrylate, hydroxyethyl methacrylate, etc.

Coloring pigments generally known are used for the above inks. The coloring pigments include various pigments disclosed in Japanese Patent KOKAI No. 63-44653, etc., azo pigments, (Azo Lake, Carmine 6B, Red 2B, insoluble azo pigments, Monoazo Yellow (PY-1,-3), Disazo Yellow (PY-12,-13,-14,-17,-83), Pyrazolo Orange (PO-B-34), Vulcan Orange (PO-16), condensed azo pigments, Chromophthal Yellow (PY-93,-95), Chromophthal Red (PR-144,-166)), polycyclic pigments (phthalocyanine pigments, Copper Phthalocyanine Blue (PB-15,-15.1,-15.3), Copper Phthalocyanine Green (PG-7)), dioxane pigments (Dioxane Violet (PV-23)), isoindolinone pigments (Isoindolinone Yellow (PY-109,-110)), durene pigments, perillene, perinone, flavanthrone, thoindigo, lake pigments (Malachite Green, Rhodamine B, Rhodamine G, Victoria Blue B), inorganic pigments, such as oxides (titanium dioxide, red ion oxide), sulfates (precipitated barium sulfate), carbonates (precipitated calcium carbonate), silicates (hydrous silicates, anhydrous silicates), metal powders (aluminum powder, bronze powder, zinc powder), carbon black, lead yellow, Ultramarine blue, Berlin blue, and the like. These pigments may be added to the aforementioned resin layers or the like as a light-shielding material. In addition, oil-soluble dyes, disperse dyes, and the like are also usable. Other raw materials composing the ink which are optional are various solvent, dispersing agent, wetting agent, antifoamer, leveling agent, thickener, stabilizer, crosslinking agent, wax and the like.

It is also preferable to use the above synthetic resins and coloring pigments as paint for coating the molded article for the purpose of the improvement in the commercial value, wear resistance, light-shielding ability, photographic properties or the like.

The molded article for photographic photosensitive materials of the invention is applicable to the following photosensitive materials.

Silver halide photographic photosensitive materials: films for printing, color and monochrome photographic printing papers, color and monochrome films, master papers for printing, DTR (diffusion transfer process) photosensitive materials, films and papers for computerized type-setting system, color and monochrome positive films, color reversal films, microfilms, films for movie, self-developing type photographic photosensitive materials, direct positive films and papers, etc.

Heat developing photosensitive materials: heat developing color photosensitive materials, heat developing monochromatic photosensitive materials, e.g. disclosed in Japanese Patent KOKOKU Nos. 43-4921, 43-4924, "Shashinkogaku-no-Kiso (Fundamentals of Photographic Engineering), Vol. Silver Salt Photograph", pp 553–555, Corona, 1979, "Research Disclosure", pp 9–15 (RD-17029), June, 1978, transfer-type heat developing color photosensitive materials disclosed in Japanese Patent KOKAI Nos. 59-12431, 60-2950, 61-52343, U.S. Pat No. 4,584,267, etc.

Photosensitive heatsensitive recording materials: recording materials using photothermography (photosensitive heat-sensitive image forming method) disclosed in Japanese Patent KOKAI No. 3-72358.

Diazonium photographic photosensitive materials: 4-morpholinobenzene diazonium microfilms, microfilms, copying films, form plates for printing, etc.

Azide, diazide photographic photosensitive materials: photosensitive materials containing parazidobenzoate, 4,4'-diazidostilbene, etc., such as copying films and form plates for printing etc.

Quinone diazide photographic photosensitive materials: photosensitive materials containing ortho-quinone diazide compounds or ortho-naphthoquinone diazide compounds, such as benzoquinone-(1,2)-diazido-(2)-4-sulfonic acid phenyl ether, such as form plates for printing, copying films and contact printing film, etc.

Photo polymers: photosensitive materials, form plates for printing, contact printing films, containing vinyl compound monomer, etc.

Polyvinyl cinnamate esters: printing films, photoresists for IC, etc.

Moreover, the packaging material of the invention is also applicable to various photosensitive materials degraded or denatured by light, oxygen, sulfur dioxide gas or the like, such as foods including peanuts with butter, margarine, snacks, relishes, cakes, teas and lavers, medicines including powder and granular medicines placed in a bag for stomach and bowels and for cold, dyes, pigments, photographic developing agent, photographic fixing agent, toners and the like.

In the molded article for photographic photosensitive materials of the invention, the antioxidant and the acrylic acid copolymer resin retard the bleeding out of the lubricant, the antistatic agent and the like. The oil-absorptive material absorbs the lubricant, the antistatic agent and the like to prevent the bleeding out of them. The antioxidant also inhibits the generation of materials which adversely affect photographic properties of photographic photosensitive materials by the thermal decomposition of resins or additives. As a result of decreasing the bleeding out with time of the lubricant and the antistatic agent, lubricating ability and antistatic ability can be kept for a long period, and the generation of white powder caused by the bleeding out can be decreased. Fogging and sensitivity deviation of the photographic photosensitive materials can also be decreased.

By coating the surface of the light-shielding material with the aforementioned surface-coating material, the dispersibility of the light-shielding material in the resin composition is improved. As a result, various advantages are obtained, such as the prevention of adverse affects on photographic properties of the photographic photosensitive materials, a sharp increase of light-shielding ability, decrease of lump generation, decrease of coloring roubles, improvement in appearance, etc.

Some molded articles for photographic photosensitive materials embodying the invention are illustrated in FIGS. 1 through 18.

FIGS. 1 through 9 illustrate films.

The film for photographic photosensitive materials of FIG. 1 is a single layer film consisting of a light-shielding thermoplastic resin film layer 1a.

Figure 2:
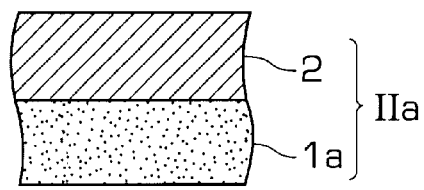

The film for photographic photosensitive materials of FIG. 2 is a coextruded double layer film IIa consisting of a light-shielding thermoplastic resin film layer 1a and a thermoplastic resin film layer 2.

Figure 3:
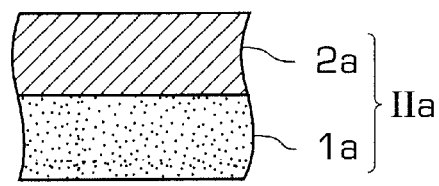

The film for photographic photosensitive materials of FIG. 3 is the same as the film of FIG. 2, except that the thermoplastic resin film layer 2a also contains a light-shielding material.

Figure 4:
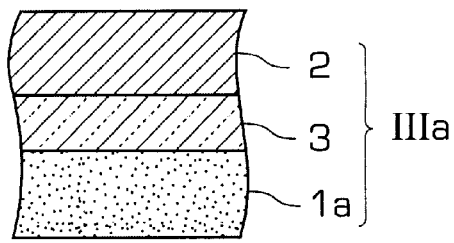

The film for photographic photosensitive materials of FIG. 4 is a coextruded triple layer film IIIa consisting of a light-shielding thermoplastic resin film layer 1a, an intermediate layer 3 and a thermoplastic resin film layer 2.

Figure 5:
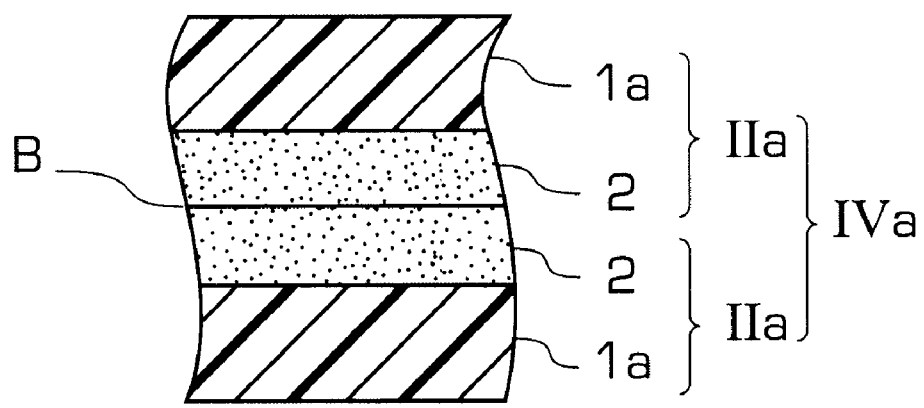

The film for photographic photosensitive materials of FIG. 5 is a laminated film IVa consisting of two coextruded double layer films IIa of FIG. 2 joined by blocking B between the thermoplastic resin film layers 2,2.

Figure 6:
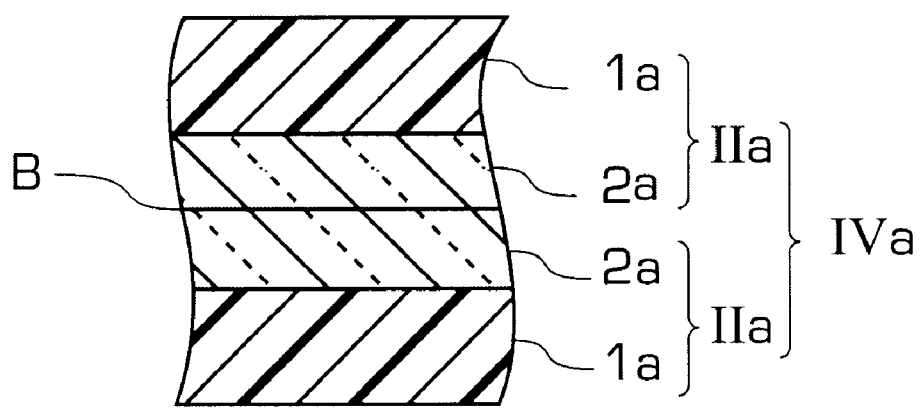

The film for photographic photosensitive materials of FIG. 6 is a laminated film IVa consisting of two coextruded double layer films IIa of FIG. 3 joined by blocking B between the thermoplastic resin film layers 2a, 2a.

Figure 7:
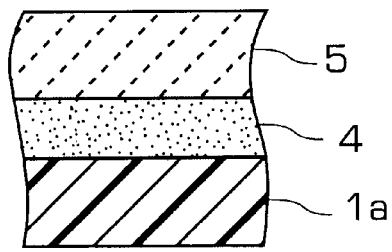

The film for photographic photosensitive materials of FIG. 7 is a laminated film consisting of the single layer film of FIG. 1 consisting of a light-shielding thermoplastic resin film layer 1a and a flexible sheet layer 5 laminated through an adhesive layer 4.

The film for photographic photosensitive materials of FIG. 8 is a laminated film consisting of the single layer film of FIG. 1 consisting of a light-shielding thermoplastic resin film layer 1a, a metallized biaxially stretched film layer 9 consisting of a biaxially stretched film layer 6, on which a metal vacuum deposition layer 8 deposited through an anchor coat layer 7, laminated thereon through an adhesive layer 4 and a flexible sheet layer 5 laminated further thereon through an adhesive layer 4.

The film for photographic photosensitive materials of FIG. 9 is a laminated film consisting of the single layer film of FIG. 1 consisting of a light-shielding thermoplastic resin film layer 1a, a metal foil 10 laminated thereon through an adhesive layer 4 and a flexible sheet layer 5 laminated further thereon through an adhesive layer 4.

FIG. 10 through 12 illustrate containers for a photographic film cartridge.

The containers 14 for a photographic film cartridge of FIGS. 10 and 11 are a cap separated from body type, and consists of a container body 15 and a cap 16. Both of the container body 15 and the cap 16 are the molded article embodying the invention. Both containers are the same, except that the container body 15 of FIG. 11 is tapered having a greater inside diameter (A+α) of the upper opening portion than the inside diameter (A) of the bottom portion so that stacking is possible.

The container 14 for a photographic film cartridge of FIG. 12 is a cap-body integrated type consisting of a container body 15 portion and a cap 16 portion, and is formed of the thermoplastic resin composition of the invention.

FIG. 13 illustrates a spool 20 for a photographic film, the whole body of the spool is formed of the light-shielding thermoplastic resin of the invention.

FIG. 14 illustrates an exploded state of a photographic film cartridge 17 consisting of an upper casing 18 and a lower casing 19, which constitute the cartridge body, and a spool 20 on which the photographic film 35 to be loaded is wound. All of the upper casing 18, the lower casing 19 and the spool 20 are formed of the light-shielding thermoplastic resin composition of the invention.

Figure 15:
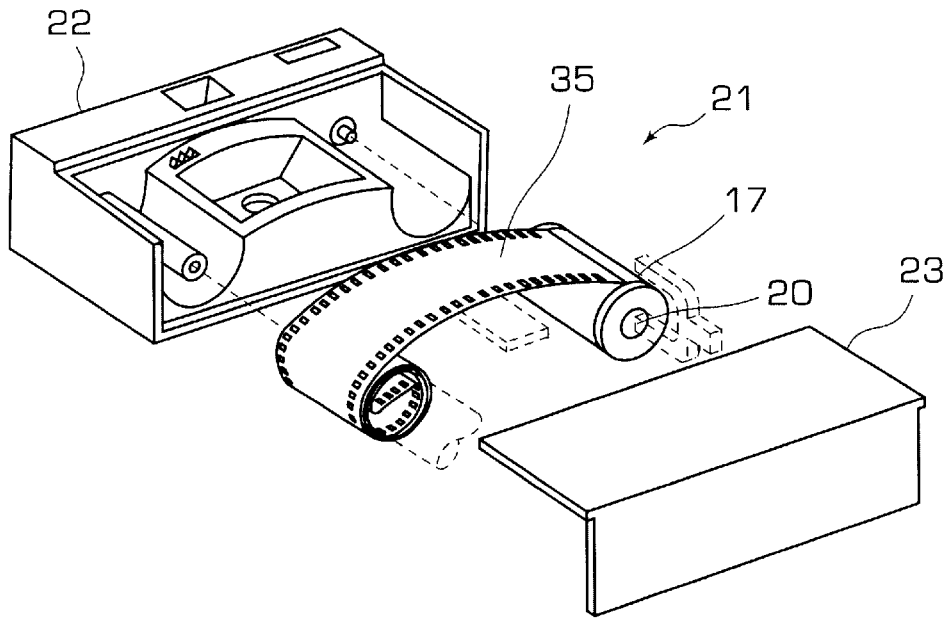
FIG. 15 is an exploded perspective view of a photographic film unit with lenz embodying the invention.

FIG. 15 illustrates an exploded state of a photographic film unit 21 with lenz, consisting of a lower casing 22 in which a light-shielding photographic film cartridge 17 containing a photographic film wound around a spool 20 is set in a state shielded from light and an upper casing 23 which seals the lower casing 22 so as to form a light-shielding condition. All of the spool 20, the lower casing 22 and the upper casing 23 are formed of the light-shielding thermoplastic resin composition of the invention.

Figure 16:
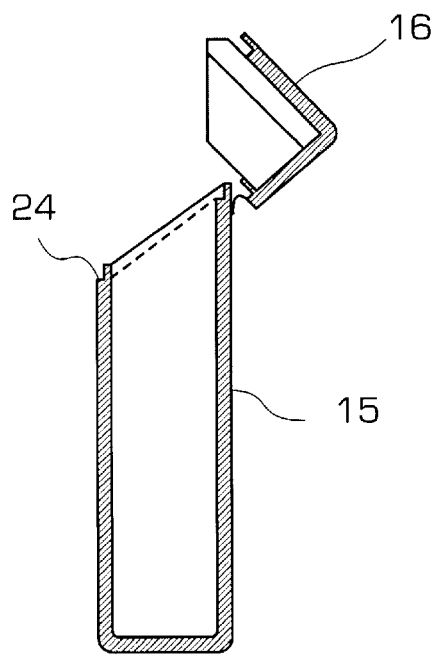
FIG. 16 is a sectional view of a cap-body integrated type case for a photographic film embodying the invention.

FIG. 16 illustrates a cap-body integrated type case 24 for a photographic film consisting of a container body 15 portion and a cap 16 portion, and is formed of the light-shielding thermoplastic resin composition of the invention.

Figure 17:
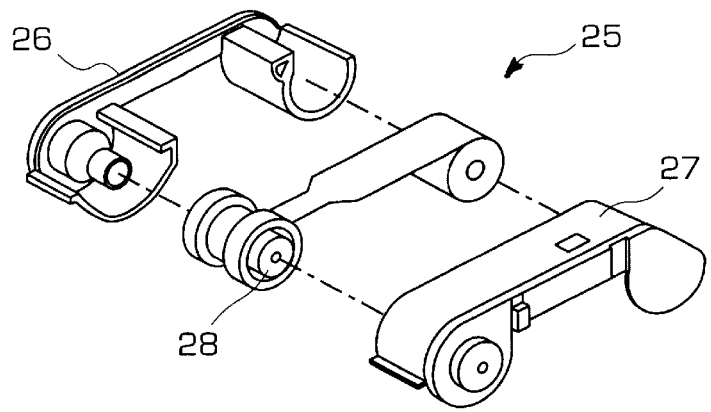
FIG. 17 is an exploded perspective view of a photographic film cartridge embodying the invention.

FIG. 17 illustrates an exploded state of a photographic film cartridge 25 consisting of a lower casing 26, an upper casing 27 and a spool 28 loaded therein, and all of the lower casing 26, the upper casing 27 and the spool 28 are formed of the light-shielding thermoplastic resin composition of the invention.

Figure 18:
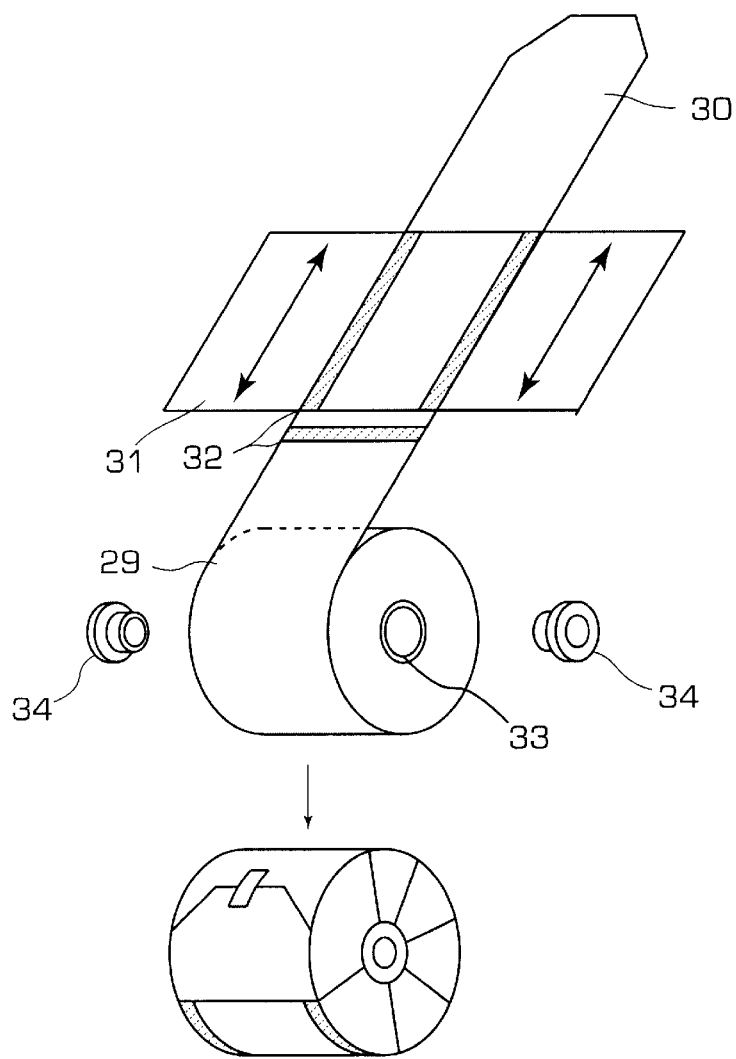
FIG. 18 is a perspective view illustrating a packaging process of a package of a roll photographic photosensitive material using a light-shielding film provided with a light-shielding thermoplastic resin film layer embodying the invention.

FIG. 18 illustrates a packaging process of a package of a roll of photographic photosensitive material. In the figure, a thermoplastic resin film guide member 30 is joined to the leading end of the roll of, photographic photosensitive material 29 wound around a core 33. A light-shielding thermoplastic resin film cover member 31 is joined near the base end of the guide member 30. After the guide member 30 is wound entirely, both flap portions of the cover member 31 are gusseted toward the opening end of the core 33, and the gusseted end is fixed by inserting a bush 34 into the opening end of the core 33,32 indicates joining portions.

EXAMPLES

Example 1

A single layer film consisting of a light-shielding thermoplastic resin film layer 1a corresponding to FIG. 1 was formed by the inflation process.

The molding resin composition was a polyolefin resin composition consisting of;

100 parts by weight of crystalline resin composition consisting of 70 parts by weight of ethylene-4-methylpentene-1 copolymer resin having a MFR (ASTSM D-1238, indicated by the number of grams of ejected polyethylene resin from an orifice 2.095 mm in diameter, 8.0 mm in length for 10 minutes at 190° C.±0.5° C. at a load of 2.16 kg) of 2.0 g/10 minutes, a density (ASTM D-1505) of 0.920 g/cm$^3$ and a crystallinity of 45%, 10 parts by weight of homopolyethylene resin having a MFR of 14 g/10 minutes, a density of 0.950 g/cm$^3$ and a crystallinity of 83%, 19.5 parts by weight of homopolyethylene resin having a MFR of 2.0 g/10 minutes, a density of 0.925 g/cm$^3$ and a crystallinity of 67% as the crystalline resins, 0.05 part by weight of erucic acid amide as the lubricant and 0.2 part by weight of nonionic antistatic agent of glycerine monostearate as the antistatic agent, 0.10 part by weight of hindered phenolic antioxidant of tetrakis [methylene-3(3e5-di-tert-butyl-4-hydroxyphenyl) propionate]methane and 0.05 part by weight of n-octadecyl-3-(4'-hydroxy-3',5'-di-tert-butylphenol)propionate as the antioxidant, 30 parts by weight of ethylene-acrylic acid copolymer resin having a MFR of 5.5 g/10 minutes, a density of 0.932 g/cm$^3$ and an acrylic acid content of 6.5 wt. % as the ethylene-acrylic acid copolymer resin, and 3.3 parts by weight of furnace carbon black having a pH of 8.0, a volatile component content of 0.8 wt. %, an oil absorption value of 76 ml/100 g and a mean particle size of 21 m$\mu$ as the light-shielding material.

Using the above polyolefin resin composition, the single layer film 70 $\mu$m in thickness of a light-shielding polyolefin resin inflation film was formed by an inflation film molding machine having a ring die 50 cm$\phi$ in diameter with a lip clearance of 1.1 mm, at a resin temperature of 190° C. at a blow-up ratio of 1:1.2.

The light-shielding inflation film was excellent in antistatic ability and slipping character, and the bleeding out with time of the antistatic agent and the lubricant was small. Greasiness and blocking did not occur, and heat sealing properties were excellent.

Comparative Example 1

A single layer film 70 $\mu$m in thickness was formed by the inflation process using the same resin composition as Example 1, except that 30 parts by weight of homopolyethylene resin having a MFR of 5.0 g/10 minutes, a density of 0.919 g/cm$^3$ and a crystallinity of 65% was blended instead of 30 parts by weight of the ethylene-acrylic copolymer resin, and that 2 kinds of the antioxidant were not added. The molding machine and the molding conditions were also the same as Example 1.

In the light-shielding inflation film, the bleeding out with time of the antistatic agent and the lubricant was great, and greasiness and blocking occurred. Heat sealing properties were inferior. Moreover, photographic properties were adversely affected, and lumps of microgrits were frequently generated.

Conventional Example 1

A single layer film 70 $\mu$m in thickness was formed by the inflation process using a resin composition consisting of 99.75 parts by weight of homopolyethylene resin having a MFR of 2.0 g/10 minutes, a density of 0.925 g/cm$^3$ and a crystallinity of 67%, 0.05 part by weight of erucic acid amide as the lubricant, 0.2 part by weight of glycerine monostearate. The molding machine and the molding conditions were the same as Example 1.

In the inflation film, the bleeding out with time of the antistatic agent and the lubricant was great, and greasiness and blocking occurred. Heat sealing properties were inferior.

Example 2

A laminated film corresponding to FIG. 8 was molded.

Using the light-shielding polyolefin resin inflation film 1a 70 μm in thickness of Example 1, an aluminum vacuum deposited biaxially stretched film layer 9 consisting of a biaxially stretched nylon resin film 6 of a thickness of 15 μm on which an aluminum vacuum deposition layer 8 of a thickness of 400 Å was formed through an anchor coat layer 7 of a thickness of 2 μm was laminated thereon through an extrusion laminating low density homopolyethylene resin adhesive layer 4 of a thickness of 13 μm formed at a resin temperature of 315° C. As the flexible sheet layer 5 an unbleached kraft paper having an areal weight of 70 g/m² not effecting adversely photographic photosensitive materials was laminated further thereon through an extrusion laminating low density homopolyethylene resin adhesive layer 4 of a thickness of 13 μm formed at a resin temperature of 305° C. to complete the laminated film.

Two sheets of the laminated films were joined between the light-shielding polyolefin resin inflation film layers 1a, 1a by heat sealing to form a light-shielding sealing bag, and a roll of color printing paper 8.9 cm in width 180 m in length wound around a paper core 7.6 cm in outer diameter 8 mm in wall thickness facing the photographic emulsion layer on the outside was packaged in a gussets bag form having a center seal and gussets to complete a sealed package.

The package was excellent in light-shielding ability, antistatic ability and physical strength. After storing for 1 year, sealing light-shielding ability was still excellent, and decrease of heat seal strength was small. Antistatic ability was excellent, and bleeding out onto the light-shielding inflation film layer surface was moderate. No blocking to the photographic emulsion layer, development inhibition by the transfer to the photographic emulsion layer nor the adhesion of white powder occurred. The outermost portion of the roll of color printing paper which was out of quality assurance as a guide portion could be used for printing photographs.

Example 3

A laminated film corresponding to FIG. 9 was molded.

The same laminated film as Example 2 was prepared, except that an aluminum foil 7 μm in thickness as the metal foil 10 was substituted for the aluminum vacuum deposited biaxially stretched film layer 9, and a package of a roll of color printing paper was prepared similar to Example 2.

The package also exercised unexpected results similar to Example 2 after storing for 1 year.

Example 4

The same laminated film as Example 2 was molded, except that a biaxially stretched polyester resin film 12 μm in thickness was used instead of the unbleached kraft paper as the flexible sheet layer 5 and the light-shielding polyolefin resin inflation film 1a of Example 1 was used as the innermost layer, and a package of a roll of color printing paper was prepared similar to Example 2.

The package also exercised unexpected results similar to Example 2 after storing for 1 year. Since a dust-free biaxially stretched polyester resin film was used as the outermost layer, the package was further preferable because of no generation of dust.

Comparative Example 2

The same laminated film as Example 4 was molded, except that the light-shielding polyolefin resin inflation film 70 μm in thickness of Comparative Example 1 was used instead of the light-shielding polyolefin resin inflation film 1a 70 μm in thickness of Example 1 which was used as the innermost layer in Example 2, and a package of a roll of color printing paper was prepared similar to Example 2.

The package had similar properties to Example 2 initially, except of frequent lump generation in the innermost layer, but, after 1 year, bleeding out of erucic amide and glycerine monostearate onto the surface was much, and transferred to the photographic emulsion layer of the roll of color printing paper. Static marks were formed at the time of taking out of the bag by the blocking to the photographic emulsion layer, and uneven development based on the development inhibition occurred caused by the transfer of erucic amide and glycerine monostearate. As a result, the outermost round portion could not be used for printing photographs.

Conventional Example 2

The same laminated film as Example 2 was molded, except that the light-shielding low density homopolyethylene resin inflation film 70 μm in thickness of Conventional Example 1 was used instead of the light-shielding polyolefin resin inflation film la 70 μm in thickness of Example 1 which was the innermost layer in Example 2, and a package of a roll of color printing paper was prepared similar to Example 2.

The package was remarkably inferior to Example 2 in sealing light-shielding ability, heat seal strength, hot tack properties and the like from the first. After 1 year, bleeding out of erucic amide and glycerine monostearate onto the surface of the innermost layer was much. Heat seal strength was decreased to about a half, and the heat-sealed portion was occasionally separated by the weight of the roll alone. This is a great problem for the light-shielding bag for photographic photosensitive materials which require complete light-shielding. Moreover, bleeding out of erucic amide and glycerine monostearate onto the surface was much, and transferred to the photographic emulsion layer of the roll of color printing paper. Static marks were formed at the time of taking out of the bag by the blocking to the photographic emulsion layer, and uneven development based on the development inhibition occurred caused by the transfer of erucic acid amide and glycerine monostearate. As a result, the outermost round portion could not be used for printing photographs.

Example 5

A container body corresponding to FIG. 10 was molded.

The molding resin composition was a polypropylene resin composition consisting of;

100 parts by weight of polypropylene resin composition consisting of 99.85 parts by weight of propylene-ethylene random copolymer resin having a MFR of 35 g/10 minutes, a density of 0.900 g/cm³ and a crystallinity of 93% as she crystalline resin, 0.05 part by weight of oleic acid amide as the lubricant and 0.1 part by weight of polyoxyethylene sorbitan stearate as the antistatic agent, 0.10 part by weight of hindered phenolic antioxidant of tetrakis[methylene-3(3.5-di-tert-butyl-4-hydroxyphenyl)

propionate] methane and 0.10 part by weight of n-octadecyl-3-(4'-hydroxy-3',5'-di-tert-butylphenol)propionate as the antioxidant, 20 parts by weight of ethylene-acrylic acid copolymer resin having a MFR of 13 g/10 minutes, a density of 0.940 g/cm$^3$ and an acrylic acid content of 8 wt. % as the ethylene-acrylic acid copolymer resin, and 0.15 part by weight of 1.3,2.4-di-(methylbenzylidene) sorbitol of which the surface had been treated with magnesium stearate as the organic nucleating agent.

Using the above polypropylene resin composition, the container body for a photographic film cartridge was formed by injection molding using an injection molding machine using a mold having a number of cavities of 24 at a mold clamping pressure of 150 t at a resin temperature of 220° C. at a molding cycle of 8 seconds.

In the molded container bodies, coloring trouble and adverse affects on photographic properties of photographic photosensitive materials did not occur. Troubles caused by the bleeding out of lubricant, antistatic agent or antioxidant did not occur, and fatal molding troubles, such as short shot, was rare. Moreover, deformation also did not occur, and continuous unmanned injection molding became possible for a long period.

The molded product of the container body for a photographic film cartridge was excellent in shortening of molding cycle, in high speed pneumatic conveying due to good slipping between the container bodies, resistance to abrasion, antistatic properties, little adhesion of dust, and insertion of a photographic film cartridge into the container body. Moreover, appearance was very excellent, and dropping strength from 5 m height to concrete floor was very great, and particularly, dropping impact strength at a low temperature condition of not more than 0° C. was greater than twice that of the container body for a photographic film cartridge of Comparative Example 3 not containing ethyene-acrylic acid copolymer resin. After storing at 18° C. for 1 year, bleeding out of the lubricant of oleic amide and the antistatic agent of polyoxyethylene sorbitan monostearate onto the surface of the container body was small, and greasiness, dust adhesion and white powder generation were rare. Appearance was excellent, and impact strength, slipping character and antistatic properties were also excellent. Unexpectedly, it was found that mold shrinkage caused by the gradual proceeding of crystallization of polypropylene resin is decreased by blending ethylene-acrylic acid copolymer resin.

Example 6

A container body corresponding to FIG. 10 was molded.

Using a light-shielding propylene-ethylene random copolymer resin composition composed of the polypropylene resin composition of Example 5 blended with 5 parts by weight of titanium dioxide inorganic pigment of which the surface was coated with zinc stearate as the light-shielding material, the container body was molded using the same injection molding machine and the same mold as Example 5 at a resin temperature of 220° C. at a molding cycle of 7 seconds.

In molding the container body for a photographic film cartridge, fatal molding troubles did not occur, and continuous unmanned injection molding was possible for a long period. Appearance was also excellent. In the molded product of the container body for a photographic film cartridge, deformation, such as buckling or bottom sink mark did not occur, even though the molding cycle was shortened by 1 second form Example 5. The occurrence of coloring trouble was rare. Dropping strength was very greater than Example 5, and the generation of cracking was 0% at ordinary temperature (20° C.). Dropping strength under low temperature conditions at not more than 0° C. was greater than Comparative Example 3, and the generation of cracking was decreased to less than one half. Nevertheless the container body was white opaque, even though the container body was left under the sunlight for 3 hours, thermal deformation did not occur. The container body was excellent in heat-shielding, and temperature rise of the inside of container was not great compared with Example 5. As a result, thermal deformation of the spool contained in the cartridge did not occur, and degradation of photographic properties of the photographic film scarcely occurred. Since the color was white, transfer printability was excellent, and transferred print was beautiful and had a high commercial value. Moreover, the applicability to a curved surface high speed printer was also excellent. After storing at 18° C. for 1 year, bleeding out of the lubricant of oleic amide and the antistatic agent of polyoxyethylene sorbitan monostearate onto the surface of the container body was small, and greasiness, dust adhesion and white powder generation were less than Example 5 because of containing an oil absorption material titanium dioxide. Moreover, white powder could not be seen by the synergistic effect of white appearance.

Example 7

A container corresponding to FIG. 12 was molded which was a cap-body integrated type square container for a photographic film cartridge wherein the cap was integrated to the container body through a hinge.

Using the same propylene-ethyene random copolymer resin composition as Example 6, the container was molded by injection molding using an experimental mold having one cavity.

The properties of the molded container were excellent similar to Example 6. Moreover, since the form was square, the container had stacking ability and atore displaying ability. Moreover, decorated paper casket could be omitted, and corporation identity (CI) mark and various prints were clear because of a white opaque container. As described in Example 6, even though the container was displayed at a store, the white opaque body reflected the sunlight, and deformation of the container did not occur. Temperature rise of the inside of the container was small. As a result, thermal deformation of the spool contained in the cartridge was rare, and degradation of photographic properties of the photographic film scarcely occurred. Antistatic ability was excellent, and bleeding out of the lubricant, the antioxidant and the nucleating agent onto the surface of the container was small because of containing an oil absorption material of titanium dioxide. Adhesion of dust was small. Industrial waste could be decreased, and recycling use was many.

Comparative Example 3

A container body corresponding to FIG. 10 was molded.

Using the same propylene-ethylene random copolymer resin composition as Example 5, except that 0.2 part by weight of two kinds of the hindered phenolic antioxidant and 20 parts by weight of the ethylene-acrylic acid copolymer resin were omitted, the container body was molded using the same molding machine and the same mold as Example 5 at a molding cycle of 8 seconds.

The container body had excellent properties, dimensional accuracy and transparency almost similar to Example 5, except that dropping strength under low temperature conditions at not more than 0° C. was inferior, immediately after molding. However, after storing in a cold storage room at 18° C. for 1 year, crystallization proceeded, and dropping strength at ordinary temperature was inferior to Example 5. The lubricant of oleic acid amide and the antistatic agent of polyoxyethylene sorbitan stearate were bled out of the surface, and white powder slightly adhered onto the photographic film. Since hindered phenolic antioxidant was not added, the resin was decomposed to produce aldehydes and the like at retarded portions during continuous molding for a long period, and they adversely affected photographic photosensitive materials, such as fogging or sensitivity deviation. Resin yellowing occurred resulting in the occurrence of coloring troubles, and lumps were generated to induce gate clogging and short shot problem. Thus, unmanned continuous molding was difficult.

Example 8

A container body corresponding to FIG. 10 was molded.

The molding resin composition was a homopolyethylene resin composition consisting of;

98.8 wt. % of very high density homopolyethylene resin having a MFR (ASTM D-1238) of 9 g/10 minutes, a density (ASTM D-1505) of 0.973 g/cm$^3$, a crystallinity (X-ray diffraction method) of 97%, a haze (ASTM D-1003) of 72%, a bending elastic modulus (ASTM D-790) of 15,600 kg/cm$^2$, a Shore hardness (ASTM D-2240) of 74D, a notched Izod impact strength (ASTM D-256) at 23° C. of 4.1 kg·cm/cm, a Vicat softening point (ASTM D-1525) of 131° C., a melting point (ASTM D-2117) of 140° C. and an elongation at rupture (ASTM D-638) of 358%, 0.1 wt. % of 1,1-diphenyl-2-picrylhydrazyl as the radical scavenger, 0.1 wt. % of a hindered phenolic antioxidant of pentaerythrityl-tetrakis [3-(3.5-di-t-butyl-4-hydroxyphenyl) propionate] methane having a melting point of not less than 100° C., and 0.05 wt. % of a phosphorus-containing antioxidant of an organic cyclic phosphorus compound having the formula [A] previously mentioned as the antioxidant, 0.2 wt. % of 1-3,2*4-di(paramethylbenzylidene)sorbitol ("Gel All MD", New Japan Chemical) as the organic nucleating agent, 0.1 wt. % of glycerine monostearate ester as the dripproofing agent, 0.1 wt. % of calcium stearyl lactate and 0.05 wt. % of erucic acid amide as the lubricant, 0.3 wt. % of magnesium stearate, and 0.2 wt. % of A-type zeolite.

Using the above homopolyethylene resin composition, the container body for a photographic film shown in FIG. 10 was formed by using a toggle type injection molding machine ("NESTAL", Sumitomo Heavy Industries) with a hot runner type mold having a number of cavities of 24 at a mold clamping pressure of 150 t at a resin temperature of 200° C.

The inner surface was roughened by forming longitudinal ribs 0.25 μm in height, and the outer surface was roughened by forming lattice ribs 0.15 μm in height.

The haze of the container body was excellent of 31%, and the design, print and the like of the cartridge for a photographic film in the container body could be seen clearly. The photographic properties of photographic photosensitive materials were excellent, and the occurrence of fogging and sensitivity deviation was rare. Thermal degradation of resin and additives was small, and coloring troubles and lump generation were rare. Fatal molding troubles did not occur, and continuous unmanned injection molding was possible for a long period. Appearance was also excellent. Because of using a resin having a high crystallinity of 97%, rigidity was great, and wear resistance was excellent. The cooling time after molding could be sharply shortened, and 6 second molding became possible. By adding the effects of roughening the inner peripheral surface of the container body by forming longitudinal ribs 0.25 μm in height, buckling and bottom sink mark did not occur at all, and the pop sould did not generate at the time of extracting the mold core from the container body. Dropping strength under low temperature conditions was improved, and cracking did not occur (0%) by dropping the container body containing a ISO photographic speed 400 photographic speed negative film of 36 exposures sealed by attaching a cap from 5 m height to concrete floor at 0° C.

Moreover, when a photographic film cartridge was taken out from the container after storing in a cold storage room for 1 year, foreign odor was decreased to the degree of not finding, and water drops on the peripheral wall of the container body were not observed. Degradation of photographic performance was within 5% which does not affect photographing at all.

Example 9

A container body corresponding to FIG. 10 was molded.

The molding resin composition was a homopolyethylene resin composition consisting of;

98.3 wt. % of high density homopolyethylene resin having a MFR (ASTM D-1238) of 18 g/10 minutes, a density (ASTM D-1505) of 0.963 g/cm$^3$, a crystallinity (X-ray diffraction method) of 92%, a haze (ASTM D-1003) of 65%, a bending elastic modulus (ASTM D-790) of 12,800 kg/cm$^2$, a Shore hardness (ASTM D-2240) of 70D, a notched Izod impact strength (ASTM D-256) at 23° C. of 4.7 kg.cm/cm, a Vicat softening point (ASTM D-1525) of 133° C., a melting point (ASTM D-2117) of 140° C. and an elongation at rupture (ASTM D-638) of more than 500%.

0.3 wt. % of A-type zeolite as an inorganic substance having ion-exchange ability, 0.1 wt. % of a hindered phenolic antioxidant of pentaerythrityl-tetrakis [3-(3.5-di-t-butyl-4-hydroxyphenyl) propionate]methane, and 0.05 wt. % of a phosphorus-containing antioxidant of tris(2,4-di-t-butylphenyl) phosphite as the antioxidant, 0.2 wt. % of 1.3,2.4-di(paramethylbenzylidene)sorbitol ("Gel All MD", New Japan Chemical) as the organic nucleating agent, 0.1 wt. % of glycerine monostearate ester as the dripproofing agent, 0.1 wt. % of calcium stearyl lactate and 0.05 wt. % of erucic acid amide as the lubricant, and 0.8 wt. % of oil furnace carbon black which is an oil absorption material having a mean particle size of 21 μm, a pH of 8.0, an oil absorption value of 87 ml/100 g, a sulfur content of 0.3 wt. % and a volatile component content of 0.3 wt. % of which the surface had been coated with 0.2 wt. % of zinc stearate.

Using the above homopolyethylene resin composition, the container body for a photographic film shown in FIG. 10 was formed by using a toggle type injection molding machine ("NESTAL", Sumitomo Heavy Industries) with a hot runner type mold having a number of cavities of 24 at a mold clamping pressure of 150 t at a resin temperature of 200° C.

The inner surface was roughened by forming longitudinal ribs 0.25 μm in height, and the outer surface was roughened by forming lattice ribs 0.15 μm in height.

In the container body uniform dispersibility of carbon black was improved, and the photographic properties of photographic photosensitive materials were excellent, and the occurrence of fogging and sensitivity deviation was rare. Since a high density homopolyethylene resin having a high haze was used, light-shielding ability was excellent. Coloring troubles did not occur at all, and lump generation were rare. Fatal molding troubles did not occur, and continuous unmanned injection molding was possible for a long period. Appearance was also excellent. Because of using a resin having a high crystallinity of 92%, rigidity was great, and wear resistance was excellent. The cooling time after molding could be shortened, and 7 second molding became possible. By adding the effects of roughening the inner peripheral surface of the container body by forming longitudinal ribs 0.25 μm in height, buckling and bottom sink mark did not occur at all, and the pop sould did not generate at the time of extracting the mold core from the container body.

Example 10

A spool for a photographic film corresponding to FIG. 13 was molded.

The molding resin composition consisted of;

100 parts by weight of propylene-ethylene random copolymer resin consisting of 70 parts by weight of propylene-ethylene random copolymer resin composed of 98 wt. % of propylene and 2 wt. % of ethylene having a MFR of 40 g/10 minutes, a density of 0.90 g/cm$^3$, a crystallinity of 95%, a bending elastic modulus (ASTM D-790) of 12,500 kg·cm/cm, molecular weight distribution (weight average molecular weight/number average molecular weight, MW/MN) of 4.5, 29.5 parts by weight of low pressure vapor process ethylene-butene-1 copolymer resin composed of 96 wt. % of ethylene and 4 wt. % of butene-1 having a MFR of 25 g/10 minutes, a density of 0.925 g/cm$^3$, an Olsen rigidity of 2,800 kg/cm$^2$ (ASTM D-747) and a molecular weight distribution (weight average molecular weight/number average molecular weight) of 3.5, 0.10 part by weight of lubricant of erucic acid amide, 0.2 part by weight of calcium hydroxystrearate, and 0.2 part by weight of antistatic agent of monoglyceride stearate having a monoglyceride content of 95%, 0.10 part by weight of vitamin E ((α-tocopherol) as the antioxidant, 0.05 part by weight of a hindered phenolic antioxidant of 2,6-di-tert-butyl-p-cresol (BHT), and 0.3 part by weight of calcium carbonate of which the surface had been treated with 0.2 part by weight of dimethylpolysiloxane as the inorganic nucleating agent.

Using the above resin composition, the spool for a photographic film shown in FIG. 13 was formed by using an injection molding machine with a hot runner type mold having a number of cavities of 24 at a mold clamping pressure of 150 t at a resin temperature of 205° C. at a molding cycle of 8 seconds.

In the spool for a photographic film, fatal molding troubles, such as coloring trouble, short shot and defective light-shielding occurred rarely. Slipping character was very excellent, and taking out from the mold was excellent. Deformation did not occur, and continuous unmanned injection molding became possible for a long period. In the conventional spool for a photographic film made of polystyrene resin, surfactant was coated on the flange portion in order to decrease the extending torque of photographic film. Compared with the conventional spool, the spool of this example was excellent in shorter molding cycle, less occurrence of abrasion, better slipping character resulting in the decrease of the extension torque of photographic film. The above properties were particularly effective for automatic winding photographic film camera using an electrical cell, such as a sharp decrease of winding stop during photographing and a sharp decrease of the consumption of electrical cell. Moreover, chemical resistance and solvent resistance were remarkably improved. Thus, the spool was preferable because of being used in development processing stations wherein various agents are used and in the world having a wide temperature variation.

Unexpectedly, fogging of photographic film was decreased by 0.03 in density, and light-shielding ability was improved by 15%, i.e. the same light-shielding ability can be ensured by decreasing light-shielding material in an amount of 15%. Uniform dispersibility of light-shielding material was improved, and sink at the thickened part, warpage of flange and a great mold shrinkage, which occurred in the case of using a conventional crystalline resin of propylene-ethylene random copolymer resin, were improved to the degree of no problem.

As mentioned above, the spool was excellent, and various properties were improved with rare occurrence of bleeding out of lubricant and antistatic agent. The reason is considered that the generation of aldehydes generated through the decomposition of resin by heat or oxygen adversely affecting photographic film, is decreased by the synergistic effect of specific furnace carbon black and vitamin E, that light-shielding ability is improved by the coloring of vitamin E, and that the mold shrinkage is made small by combining propylene-ethylene random copolymer resin and ethylene-butene-1 copolymer resin, having a small molecular weight distribution resulting in the decrease of sink and flange warpage.

Example 11

A cartridge for a photographic film made of resin corresponding to FIG. 14 was molded.

Using the resin composition of Example 10, the cartridge was molded by injection molding.

The cartridge was excellent in various properties similar to Example 10. It was particularly excellent in slipping character, wear resistance and injection moldability, and both torques of extending and winding photographic film were small. Stop of the extending and winding photographic film did not occur during photographing at all.

Example 12

A coextruded double layer film corresponding to FIG. 3 consisting of a light-shielding thermoplastic resin film layer 1a and a light-shielding thermoplastic resin film layer 2a was molded.

The light-shielding thermoplastic resin film layer 1a consisted of a L-LDPE resin composition consisting of 18 wt. % of homopolyethylene resin having a molecular weight distribution (MW/MN) of 7.6, a MFR of 0.6 g/10 minutes, a density of 0.925 g/cm$^3$, a crystallinity of 71%, 76.7 wt. % of ethylene-butene-1 random copolymer resin having a MFR of 5.0 g/10 minutes, a density of 0.88 g/cm$^3$, a molecular weight distribution (MW/MN) of 3.6, a crystallinity of 35%, an ethylene unit content of 80 mol. % and a butene-1 unit content of 20 mol. %, 3 wt. % of furnace carbon black having a pH of 7.0, a mean particle size of 25 μm, a weight loss or drying under bone-dry conditions of 0.08 wt. % of which the surface had been coated with magnesium stearate 0.05 wt. % of erucic acid amide, 0.05 wt. % of vitamin E and 0.05 wt. % of tetrakis [methylene-3-(3,5-di-tert-butyl-4-hydroxyphenyl) propionate] methane, and had a thickness of 50 μm with black appearance.

The light-shielding thermoplastic resin film layer 2a consisted of a L-LDPE resin composition consisting of 20 wt. % of homopolyethylene resin having a molecular weight distribution (MW/MN) of 7.6, a MFR of 1.0 g/10 minutes, a density of 0.945 g/cm$^3$ and a crystallinity of 78%, 73.5 wt. % of ethylene-octent-1 copolymer resin having a MFR of 2.5 g/10 minutes, a density of 0.92 g/cm$^3$, a crystallinity of 53%, a molecular weight distribution (MW/MN) of 3.3, an ethylene unit content of 95 mol. % and an octene-1 unit content of 5 mol. %, 6 wt. % of titanium dioxide having a weight loss on drying under bone-dry conditions of 0.15 wt. % of which the surface had been coated with a divalent alcohol, 0.05 wt. % of silica, 0.2 wt. % of zinc stearate and 0.1 wt. % of vitamin E, and had a thickness of 50 μm with white appearance.

The coextruded double layer film 100 μm in total thickness was molded by the inflation process at a blow-up ratio of 1.5.

The coextruded double layer inflation film was excellent in physical strength, heat sealing properties, photographic properties, light-shielding ability, flatness, moldability and appearance. The discrimination of the obverse side and the reverse side and finding of a sealing bag having a white appearance made by heat sealing where the black layer was disposed on the inside were possible even under a safety light. When the bag was left under the sunlight, temperature rise did not occur on both of the inside and the outside, and quality of photographic photosensitive materials contained therein was not degraded. Stacking of the bag was possible. Since vitamin E was combined with light-shielding material, light-shielding ability was improved by 15% or more. Physical strength and heat seal strength were great. Adverse affects on photographic properties, such as sensitivity deviation and fogging, of photographic photosensitive materials could be decrease by the prevention of resin decomposition.

Example 13

A container body corresponding to FIG. 10 was molded.

The molding resin composition was a polypropylene-ethylene random copolymer resin composition consisting of 8.66 wt. % of a masterbatch containing 35% of titanium dioxide prepared by dispersing 3 wt. % of titanium dioxide having a weight loss on drying under bone-dry conditions of 0.2 wt. %, 0.15 wt. % of di-(p-methylbenzylidene)sorbitol and 0.01 wt. % of o-methylbenzylidene-p-methylbenzylidene-sorbitol, of which the surfaces were coated with 0.5 wt. % of calcium stearate, into 5 wt. % of a resin mixture of low density homopolyetyylene resin and polyethylene wax, 90.54 wt. % of propylene-ethylene random copolymer resin having a MFR of 40 g/10 minutes, a density of 0.90 g/cm$^3$, a bending elastic modulus (ASTM D-790) of 10,700 kg/cm$^2$, a Rockwell hardness (ASTM D-785) of 88R, a molecular weight distribution (MW/MN) of 3.7, a propylene unit content of 96.7 wt. % and an ethylene unit content of 3.5 wt. %, 0.05 wt. % of oleic acid amide, 0.10 wt. % of a hindered phenolic antioxidant of tetrakis [methylene-3-(3,5-di-tert-butyl-4-hydroxyphenyl) propionate] methane, 0.05 wt. % of a phosphorus-containing antioxidant of trinonylphenylphosphite, 0.1 wt. % of an ultraviolet absorber of 2-hydroxy-4-octoxybenzophenone and 0.5 wt. % of diglycerine monostearate as the dripproofing agent.

Using the above polypropylene-ethyene random copolymer resin composition, the container body for a photographic film cartridge was formed by injection molding using an injection molding machine using a mold having a number of cavities of 24 at a mold clamping pressure of 150 t at a resin temperature of 220° C., a cooling water temperature of 20° C. and a molding cycle of 7 seconds.

The peripheral wall thickness of the container body was thinned to 0.7 mm from 1 mm.

Even though the temperature of the molded container body was 45° C. at the time of taking out, deformation, such as buckling and bottom sink mark, and abrasion did not occur, and continuous unmanned molding was possible for a long period. White appearance was excellent.

In the container body for a photographic film cartridge having white appearance, molding cycle was very rapid 7 seconds in spite of multi cavity molding capable of molding 24 pieces per once, and productivity was excellent. Since deformation did not occur even at a high taking out temperature of around 45° C., Rockwell hardness was improved to 98R by raising crystallinity. As a result, abrasion and abrasion dust were not generated by conveying the container body pneumatically at a high speed or putting a photographic film cartridge therein and sealing by fitting a cap.

Moreover, after storing in a cold storage room at 18° C. for 1 year, bleeding out was rarely observed, and adhesion of water drops was also not observed. Even though the container body was left in a automobile car under the sunlight, thermal deformation of the container body and the spool on which a photographic film was wound placed in the container did not occur. Printability was excellent. Even though the container body was displayed in a store as it is, discoloration and thermal deformation did not occur, and adhesion of dust was small. Photographic properties were excellent, and fogging was sharply decreased from 0.07 to 0.02 compared with the container body blended with the light-shielding material of which the surface-coating was not done.

Since the peripheral wall was thinned to 0.7 mm the leading end of photographic film could be easily placed therein, and insertion ability in an automatic apparatus was excellent. The resin gate portion was thickened by 30% than the mean thickness of the bottom portion. As a result, even though the gate portion was scraped at the time of extracting from a mold, the gate portion was kept almost the same thickness as the other bottom portion resulting in ensuring moistureproofness and light-shielding. Furthermore, Rockwell hardness was sharply improved, and as a result, not only abrasion was decreased but also cooling time after molding could be shorted by taking out at a high temperature around 40° C. resulting in sharp shortening of molding cycle. Molding troubles, such as deformation and resin remaining at gate, were rare, and unmanned molding was possible.

Example 14

A container body corresponding to FIG. 11 was molded. The thickness of the peripheral wall portion was thinned to 0.7 mm from 1 mm. The inside diameter near the bottom was adjusted to about the outer diameter of the cartridge at the exit port portion of photographic film, and the peripheral wall was tapered so as to have an inside diameter at the opening greater than the bottom by 1.5 mm. The container body was stackable.

The molding resin consisted of 77.5 wt. % of propylene-ethylene random copolymer resin having a MFR of 30 g/10 minutes, a density of 0.900 g/cm³ and a crystallinity of 87%, 2.0 wt. % of aluminum powder of which the surface had been coated with 0.05 wt. % of oleic acid amide and 0.2 wt. % of magnesium stearate, 0.05 wt. % of a hindered phenolic antioxidant of tetrakis [methylene-3(3.5-di-tert-butyl-4-hydroxyphenyl)propionate] methane and 0.05 wt. % of n-octadecyl-3-(4'-hydroxy-3',5'-di-tert-butylphenol) propionate as the antioxidant, 20 wt. % of ethylene-butene-1 copolymer resin having a MFR of 23 g/10 minutes, a density of 0.905 g/cm³ and a crystallinity of 23% as the low crystallinity resin, and 0.15 wt. % of 1 3,2 4-di-(methylbenzylidene)sorbitol of which the surface had been coated with magnesium stearate as the organic nucleating agent.

Using the above polypropylene resin composition, the container body for a photographic film cartridge was formed by injection molding using an injection molding machine using a mold having a number of cavities of 24 at a mold clamping pressure of 150 t at a resin temperature of 210° C. at a molding cycle of 8 seconds.

In the molded container bodies, fatal molding troubles, such as coloring and short shot, was rare. Moreover, deformation also did not occur, and continuous unmanned injection molding became possible for a long period.

The molded product of the container body for a photographic film cartridge was excellent in shortening of molding cycle, in high speed pneumatic conveying due to good slipping between the container bodies, resistance to abrasion, antistatic properties, little adhesion of dust, and insertion of a photographic film cartridge into the container body. Moreover, appearance was silver and very excellent, and dropping strength from 5 m height to concrete floor was very great, and particularly, dropping impact strength at a low temperature condition of not more than 0° C. was very excellent by the synergistic effect of the combination of aluminum powder and ethylene-butene-1 copolymer resin, and the occurrence of cracks was 0% compared with 6% of the container body for a photographic film cartridge of Comparative Example 4 not containing aluminum powder and ethyene-butene-1 copolymer resin. After storing at 18° C. for 1 year, bleeding out of the lubricant of oleic acid amide and magnesium stearate onto the surface of the container body was small, and greasiness, dust adhesion and white powder generation were rare. Appearance was excellent, and impact strength, slipping character and antistatic properties were also excellent. Unexpectedly, it was found that mold shrinkage caused by the gradual proceeding of crystallization of polypropylene resin is decreased by blending the surface-coated aluminum powder and ethylene-butene-1 copolymer resin. Moreover, even when the container body was left under the sunlight for 5 hours in a form of sealed container, heat absorption was small, and deformation did not occur. Temperature rise on the inside of the container was small, and degradation of the quality of photographic film did not occur.

Example 15

A container body corresponding to FIG. 10 was molded.

Using a light-shielding propylene-ethylene random copolymer resin composition composed of the polypropylene resin composition of Example 14 wherein the content of ethylene-butene-1 copolymer resin was decreased from 20 wt. % to 19 wt. %, and 3 wt. % of furnace carbon black having a mean particle size of 20 μm and a pH of 7.0 of which the surface was coated with oleic acid amide and zinc stearate as the light-shielding material, the container body was molded using the same injection molding machine and the same mold as Example 13 at a resin temperature of 210° C. at a molding cycle of 6 seconds.

In molding the container body for a photographic film cartridge, fatal molding troubles did not occur, and continuous unmanned injection molding was possible for a long period. Appearance was also excellent. In the molded product of the container body for a photographic film cartridge, deformation, such as buckling or bottom sink mark did not occur, even though the molding cycle was shortened by 9 second form Comparative Example 4. The occurrence of coloring trouble was rare. Dropping strength was very greater than Comparative Example 4, and the generation of cracking was 0% at ordinary temperature (20° C.). Dropping strength under low temperature conditions at not more than 0° C. was greater than Comparative Example 4, and the generation of cracking was decreased from 6% to 0%. Nevertheless the container body was black opaque, even though the container body was left under the sunlight for 3 hours, thermal deformation did not occur. The container body was excellent in heat-shielding, and temperature rise of the inside of container was not great compared with Comparative Example 4. As a result, thermal deformation of the spool contained in the cartridge did not occur, and degradation of photographic properties of the photographic film scarcely occurred. Since the color was black, light-shielding ability was excellent, leak of light from the exit port of photographic film cartridge was none. After storing at 18° C. for 1 year, substances adversely affecting photographic film did not generate, and fogging and sensitivity deviation did not occur. Moreover, bleeding out of lubricant, antioxidant, nucleating agent and the like was small by the adsorption on carbon black, and greasiness, dust adhesion and white powder generation were less than Example 13. Moreover, they could not be seen by the synergistic effect of black appearance.

Example 16

A container corresponding to FIG. 12 was molded which was a cap-body integrated type square container for a photographic film cartridge wherein the cap was integrated to the container body through a hinge.

Using the same propylene-ethyene random copolymer resin composition as Example 14, the container was molded by injection molding using an experimental mold having one cavity.

The properties of the molded container were excellent similar to Example 14. Moreover, since the form was square, the container had stacking ability and atore displaying ability. Moreover, decorated paper casket could be omitted, and corporation identity (CI) mark and various prints were clear because of a white opaque container. As described in Example 6 and Example 14, even though the container was displayed at a store, the white opaque body reflected the sunlight, and deformation of the container did not occur. Temperature rise of the inside of the container was small. As a result, thermal deformation of the spool contained in the cartridge was rare, and degradation of photographic properties of the photographic film scarcely occurred. Antistatic ability was excellent, and bleeding out of the lubricant, the antioxidant and the nucleating agent onto the surface of the container was small because of containing an oil absorption material of titanium dioxide. Adhesion of dust was small. Industrial waste could be decreased, and recycling use was many. Moreover, by blending a suitable amount of antioxidant, thermal degradation of resin and additives can be prevented, and the generation of substances adversely affecting photographic film can be decreased.

Comparative Example 4

A container body corresponding to FIG. 10 was molded.

Using the same propylene-ethylene random copolymer resin composition as Example 14, except that 0.1 wt. % of two kinds of the hindered phenolic antioxidant, 2.0 wt. % of aluminum powder, 0.05 wt. % of oleic acid amide and 0.2 wt. % of magnesium stearate for the surface coating of the nucleating agent and 30 wt. % of the ethylene-butene-1 copolymer resin were omitted, and the content of the propylene-ethylene random copolymer resin was increased from 77.5 to 97.85 wt. %, the container body was molded using the same molding machine and the same mold as Example 14 at a molding cycle of 8 seconds.

The container body had excellent properties, and dimensional accuracy almost similar to Example 13, except that dropping strength under low temperature conditions at not more than 0° C. and appearance were inferior, immediately after molding. However, after storing in a cold storage room at 18° C. for 1 year, crystallization proceeded, and dropping strength at ordinary temperature was inferior to Example 13. When dropped from 5 m height to concrete floor at 0° C., cracking occurred at a rate of 6%. The most important problem was inferior dispersibility of aluminum powder resulting in the degradation of appearance. Molding cycle was not less than twice Example 13 of 15 seconds or more, and buckling, short shot and bottom sink mark occasionally occurred. Slipping character was inferior and pop sound generated at the time of extracting the mold core from the container body. Since hindered phenolic antioxidant was not added, the resin was decomposed to produce aldehydes and the like at retanded portions during continuous molding for a long period, and they adversely affected photographic photosensitive materials, such as fogging or sensitivity deviation. Resin yellowing occurred resulting in the occurrence of coloring troubles, and lumps were generated to induce gate clogging and short shot problem. Thus, unmanned continuous molding was difficult.

Example 17

A spool for a photographic film corresponding to FIG. 13 was molded.

The molding resin composition consisted of 70 wt. % of propylene-ethylene random copolymer resin composed of 98 wt. % of propylene and 2 wt. % of ethylene having a MFR of 40 g/10 minutes, a density of 0.90 g/cm$^3$, a crystallinity of 95%, a bending elastic modulus (ASTM D-790) of 12,500 kg/cm$^2$, a molecular weight distribution (weight average molecular weight/number average molecular weight, MW/MN) of 4.5, 26.85 wt. % of low pressure vapor process ethylene-butene-1 copolymer resin composed of 96 wt. N of ethylene and 4 wt. % of butene-1 having a MFR of 25 g/10 minutes, a density of 0.925 g/cm$^3$, an Olsen rigidity (ASTM D-747) of 2,800 kg/cm$^2$ and a molecular weight distribution (weight average molecular weight/ number average molecular weight) of 3.5,2 wt. % of furnace carbon black having a mean particle size of 20 m$\mu$ and a pH of 7.0 of which the surface had been coated with 0.10 wt. % of a lubricant of erucic acid amide, 0.2 wt. %. of calcium hydroxystrearate, and 0.2 wt. % of antistatic agent of monoglyceride stearate having a monoglyceride content of 95%, 0.10 wt. % of vitamin E ($\alpha$-tocopherol) as the antioxidant, 0.05 wt. % of a hindered phenolic antioxidant of 2,6-di-tert-butyl-p-cresol (BHT), and 0.3 wt. % of calcium carbonate of which the surface had been treated with 0.2 wt. % of dimethylpolysiloxane as the inorganic nucleating agent.

Using the above resin composition, the spool for a photographic film shown in FIG. 13 was formed by using an injection molding machine with a hot runner type mold having a number of cavities of 24 at a mold clamping pressure of 150 t at a resin temperature of 205° C. at a molding cycle of 8 seconds.

In the spool for a photographic film, fatal molding troubles, such as coloring trouble, short shot and defective light-shielding occurred rarely. Slipping character was very excellent, and taking out from the mold was excellent. Deformation did not occur, and continuous unmanned injection molding became possible for a long period. In the conventional spool for a photographic film made of polystyrene resin, surfactant was coated on the flange portion in order to decrease the extending torque of photographic film. Compared with the conventional spool, the spool of this example was excellent in shorter molding cycle, less occurrence of abrasion, better slipping character resulting in the decrease of the extension torque of photographic film. The above properties were particularly effective for automatic winding photographic film camera using an electrical cell, such as a sharp decrease of winding stop during photographing and a sharp decrease of the consumption of electrical cell. Moreover, chemical resistance and solvent resistance were remarkably improved. Thus, the spool was preferable because of being used in development processing stations wherein various agents are used and in the world having a wide temperature variation.

Unexpectedly, fogging of photographic film was decreased by 0.03 in density, and light-shielding ability was improved by 15%, i.e. the same light-shielding ability can be ensured by decreasing light-shielding material in an amount of 15%. Uniform dispersibility of light-shielding material was improved, and sink at the thickened part, warpage of flange and a great mold shrinkage, which occurred in the case of using a conventional crystalline resin of propylene-ethylene random copolymer resin, were improved to the degree of no problem.

As mentioned above, the spool was excellent, and various properties were improved with rare occurrence of bleeding out of lubricant and antistatic agent. The reason is considered that the generation of aldehydes generated through the decomposition of resin by heat or oxygen adversely affecting photographic film, is decreased by the synergistic effect of specific furnace carbon black and vitamin E, that light-shielding ability is improved by the coloring of vitamin E, and that the mold shrinkage is made small by combining propylene-ethylene random copolymer resin and ethylene-butene-1 copolymer resin, having a small molecular weight distribution resulting in the decrease of sink and flange warpage.

Example 18

A cartridge for a photographic film corresponding to FIG. 14 was molded.

Using the resin composition of Example 17, the cartridge was molded by injection molding.

The cartridge was excellent in various properties similar to Example 17. It was particularly excellent in slipping character, wear resistance and injection moldability, and both torques of extending and winding photographic film were small. Stop of the extending and winding photographic film did not occur during photographing at all.

Example 19

81.62 wt. % of high density homopolyethylene resin having a MFR of 0.3 g/10 minutes, a density of 0.95 g/cm$^3$ and a Vicat softening point of 128° C., 0.05 wt. % of melissyl cerotate ester, 0.3 wt. % of magnesium stearate, 3 wt. % of furnace carbon black having a pH of 7.0, a mean particle size (microscopy) of 20 mμ, an oil absorption value of 80 ml/100 g, a volatile component content of 0.7%, a sulfur component content of 0.61% (containing 0.02% of free sulfur components), 0.03 wt. % of a hindered phenolic antioxidant of tetrakis [methylene-3-(3.5-di-tert-butyl-4-hydroxyphenyl)propionate]methane and 15 wt. % of powder of ethylene-butene-1 random copolymer resin having a MFR of 0.7 g/10 minutes, a density of 0.92 g/cm$^3$ and a softening point of 100° C. were sufficiently blended by a Henschel mixer, and extruded in strand by a double shaft kneader (Ikegai Corp.) at a resin temperature of 210° C., and pelletized into cylindrical pellet 3 mm in diameter 6 mm in length by a pelletizer.

Using the pellets, a light-shielding inflation film 100 μm in thickness was molded by an inflation film molding machine (Placo Co.) having a ring die 200 mmφ with a lip clearance of 1.1 mm at a blow-up ratio of 1.2 as the guide member of FIG. 18, and a light-shielding inflation film 70 μm in thickness was molded as the film cover member. As the roll photographic photosensitive material, color printing paper was used. The light-shielding inflation film 70 μm in thickness of the cover member had a molecular orientation in the longitudinal direction having a tear strength in the lateral direction of 967 g/a tear strength in the longitudinal direction of 136 g=7.1. As a result, by arranging the longitudinal direction in the arrow direction in FIG. 18, the cover member can be torn at the joined portion by pulling the guide member from the automatic developing apparatus after loading the sealed package for light room loading.

Since both of the cover member and the guide member were made of the same resin composition, the joining therebetween can be conducted by melt fusion. It is also possible to join the guide member to the roll photosensitive material by melt fusion, and the sealed light-shielding package can be formed simply. As a result of using melissyl cerotate ester, motor load was decreased by 20%, and film moldability was excellent. The thickness difference of inflation film was 6 μm less than one third of the inflation film of not blending of 22 μm. Wrinkling did not occur at all, and light-shielding, physical strength and appearance were excellent.

Example 20

Using a white ethylene-butene-1 random copolymer resin composition consisting of 94.55 wt. % of ethylene-butene-1 random copolymer resin having a MFR of 20 g/10 minutes, a density of 0.950 g/cm$^3$, an Izod impact strength of 9 kg·cm/cm, an Olsen rigidity of 7,500 kg/cm$^2$ and a Vicat softening point of 115° C., 0.05 wt. % of melissyl montanate ester, 0.2 wt. % of zinc stearate, 5 wt. % of titanium dioxide of which the surface had been coated with hydrous aluminum oxide and 0.2 wt. % of 1.3,2.4-diheptanylidenesorbitol, a cap-body integrated type case for a photographic film corresponding to FIG. 16 was formed by injection molding.

The contain did not adversely affect photographic photosensitive materials, and dropping strength was very excellent. Since the appearance was white, it could be found under a safety light. Even when it was left under the sunlight for two hours, temperature rise on the inside of the container was small, and degradation of the quality of photographic photosensitive materials did not occur. Water drops in the container were rarely observed. The motor load of screw was decreased by more than 20%, and the dispersion of thickness was small. Sealability and fitting ability were excellent, and printability was also excellent. It was possible to omitt the decorated casket by applying various sealing means for proving the virginity. After use, it could be use as a container for various small articles. Resin recycling was also possible. Since the body and the were made of the same resin composition, their separation was not necessary, and they could be pelletized as it is. Moreover, the decrease of physical strength by the pelletization was small.

Example 21

A container body corresponding to FIG. 10 was molded. The molding resin composition was a homopolyethylene resin composition consisting of;

98.65 wt. % of high density homopolyethylene resin having a MFR (ASTM D-1238) of 20 g/10 minutes, a density (ASTM D-1505) of 0.963 g/cm$^3$, a bending elastic modulus (ASTM D-790) of 15,400 kg/cm$^2$, a Shore hardness (ASTM D-2240) of 71D, a notched Izod impact strength (ASTM D-256) at 23° C. of 3.5 kg·cm/cm, a Vicat softening point (ASTM D-1525) of 124° C., a melting point (ASTM D-2117) of 134° C. and an elongation at rupture (ASTM D-638) of 387%, 0.1 wt. % of a hindered phenolic antioxidant of pentaerythrityl-tetrakis [3-(3.5-di-t-butyl-4-hydroxyphenyl) propionate] methane, and 0.05 wt. % of a phosphorus-containing antioxidant of tris(2,4-di-t-butylphenyl) phosphite as the antioxidant, 0.2 wt. % of 1.3,2.4-di(paramethylbenzylidene)sorbitol ("Gel All MD", New Japan Chemical) as the organic nucleating agent, 1 wt. % of oil furnace carbon black having a mean particle size of 21 mμ, a pH of 8.0, an oil absorption value of 87 ml/100 g, a sulfur content of 0.3 wt. % and a volatile component content of 0.3 wt. % of which the surface had been coated with 0.2 wt. % of zinc stearate, and 0.2 wt. % of A-type zeolite.

Using the above homopolyethylene resin composition, the container body for a photographic film shown in FIG. 10 was formed by using a toggle type injection molding machine ("NESTAL", Sumitomo Heavy Industries) with a hot runner type mold having a number of cavities of 24 at a mold clamping pressure of 150 t at a resin temperature of 200° C.

The inner surface was roughened by forming longitudinal ribs 0.25 μm in height, and the outer surface was roughened by forming lattice ribs 0.15 μm in height.

In the container body, uniform dispersibility of carbon black was improved, and the photographic properties of photographic photosensitive materials were excellent, and the occurrence of fogging and sensitivity deviation was rare. Light-shielding ability was excellent. Coloring troubles did not occur at all, and lump generation were rare. Fatal molding troubles did not occur, and continuous unmanned injection molding was possible for a long period. Appearance was also excellent. By adding the effects of roughening the inner peripheral surface of the container body by forming longitudinal ribs 0.25 μm in height, buckling and bottom sink mark did not occur at all, and the pop sound did not generate at the time of extracting the mold core from the container body.

What is claimed is:

1. A molded article for photographic photosensitive materials formed of a molding resin composition comprising 100 parts by weight of a crystalline resin composition comprising not less than 20 parts by weight of crystalline resin and at least one lubricant or antistatic agents 0.001 to 2 parts by weight of an antioxidant, 0.01 to 30 parts by weight of a light-shielding material and 5 to 90 parts by weight of an acrylic acid copolymer resin, wherein the light-shielding material is carbon black having a pH of 6 to 9 and a mean particle size of 10 to 120 μm, the surface of which is coated with a surface coating material, and the resin composition contains phenolic antioxidant.

2. The molded article of claim 1 wherein the crystalline resin is a polyolefin resin.

3. The molded article of claim 1 which contains vitamin E as an antioxidant.

4. The molded article of claim 1 wherein the light-shielding material is furnace carbon black having a pH of 6 to 9, a mean particle size of 10 to 120 μm, a volatile component of not more than 2% and an oil absorption value of not less than 50 ml/100 g.

5. The molded article of claim 1 which contains 0.01 to 2 parts by weight of a fatty acid metal salt.

6. The molded article of claim 1 which contains an ethylene-propylene rubber.

7. The molded article of claim 1 which contains a silicone oil.

8. The molded article of claim 1 which contains 0.01 to 10 parts by weight of inorganic material having ion-exchange ability.

9. The molded article of claim 1 which contains 0.01 to 30 parts by weight of oil-absorptive material having an oil absorption value of not less than 50 ml/100 g.

10. The molded article of claim 1 which contains a phenolic antioxidant and a phosphorus-containing antioxidant in an amount 0.001 to 2 parts by weight in total.

11. The molded article of claim 1 which is a container body for a photographic film formed of a polyolefin resin composition comprising not less than 50 parts by weight of a homopolyethylene resin, an ethylene-α-olefin copolymer resin or a combination thereof having a melt flow rate of 5 to 60 g/10 min, a density of 0.941 to 0.985 g/cm$^3$, a crystallinity of not less than 75%, a bending elastic modulus of not less than 6,000 kg/cm$^2$, a Shore hardness of not less than 60D, a notched Izod impact strength of not less than 2.0 kg-cm/cm, a Vicat softening point of not less than 110° C. and a melting point of not less than 125° C., 0.01 to 5 parts by weight of a nucleating agent, and 0.001 to 2 parts by weight of an antioxidant, radical scavenger or a combination thereof.

12. The molded article of claim 1 which is a container body for a photographic film formed of a polyethylene resin composition having a haze of not more than 50% comprising not less than 50 parts by weight of a homopolyethylene resin, an ethylene-α-olefin copolymer resin or a combination thereof having a melt flow rate of 5 to 80 g/10 min, a density of 0.941 to 0.985 g/cm$^3$, a crystallinity of not less than 75% and a bending rigidity of not less than 6,000 kg/cm$^2$, and 0.01 to 5 parts by weight of an organic nucleating agent consisting of an eutectic compound of a carboxylic acid having a number of carbon atoms of not less than 3 and a nitrogen-containing heterocyclic compound having an amino group or a hydroxyl group at the α-position, an alicyclic carboxylic acid amide compound of a divalent or polyvalent aliphatic amine, or a combination thereof.

13. The molded article of claim 1 containing a member selected from the group consisting of an oxygen scavenger, a deodorant, a moisture absorber, a drip-proofing agent and an inorganic material having an ion-exchange ability.

14. The molded article of any of claim 11 or 12 which is a container for a photographic film having a haze of not more than 50% containing 0.01 to 5 parts by weight of a nucleating agent and not less than 70 parts by weight of a homopolyethylene resin, an ethylene-α-olefin copolymer resin or a combination thereof having a crystallinity of not less than 75%.

15. The molded article of claim 1 wherein the surface-coating material is a member selected from the group consisting of a lubricant, an antistatic agent, a drip-proofing agent, a hydrous aluminum oxide, a hydrous silicon dioxide, a divalent to tetravalent alcohol, a surfactant, an organic metal chelate compound, a coupling agent, a hydrocarbon having a softening point of not more than 90° C. and a silicone oil.

16. The molded article of claim 13 which contains two or more kinds of thermoplastic resins having a softening point difference of not less than 10° C.

17. The molded article of claim 13 which is formed of a light-shielding thermoplastic resin composition containing a carbon black having an oil absorption value of not less than 50 ml/100 g, a volatile component content of not more than 3.5% and a sulfur content of not more than 0.09%, the surface of which is coated with a surface-coating material, a thermoplastic resin and a phenolic antioxidant.

18. The molded article of claim 1 which contains 0.001 to 0.5 parts by weight of an ester of an aliphatic monocarboxylic acid having a number of carbon atoms of 20 to 40 and a monovalent aliphatic alcohol having a number of carbon atoms of 20 to 40.

* * * * *